United States Patent [19]

Esser

[11] Patent Number: 5,734,258

[45] Date of Patent: Mar. 31, 1998

[54] BIDIRECTIONAL BUCK BOOST CONVERTER

[75] Inventor: Albert Andreas Maria Esser, Niskayuna, N.Y.

[73] Assignee: General Electric Company, Schenectady, N.Y.

[21] Appl. No.: 657,249

[22] Filed: Jun. 3, 1996

[51] Int. Cl.$^6$ .................................................. G05F 3/16
[52] U.S. Cl. .......................................... 323/224; 323/271
[58] Field of Search ..................................... 323/220, 223, 323/224, 259, 265, 268, 271, 282

[56] References Cited

U.S. PATENT DOCUMENTS

| | | | |
|---|---|---|---|
| 4,720,668 | 1/1988 | Lee et al. | 323/271 |
| 5,373,195 | 12/1994 | De Doncker et al. | 323/271 X |
| 5,602,463 | 2/1997 | Bendall et al. | 323/268 X |

*Primary Examiner*—Peter S. Wong
*Assistant Examiner*—Y. J. Han
*Attorney, Agent, or Firm*—Marvin Snyder

[57] ABSTRACT

A bidirectional buck boost converter and method of operating the same allows regulation of power flow between first and second voltage sources in which the voltage level at each source is subject to change and power flow is independent of relative voltage levels. In one embodiment, the converter is designed for hard switching while another embodiment implements soft switching of the switching devices. In both embodiments, first and second switching devices are serially coupled between a relatively positive terminal and a relatively negative terminal of a first voltage source with third and fourth switching devices serially coupled between a relatively positive terminal and a relatively negative terminal of a second voltage source. A free-wheeling diode is coupled, respectively, in parallel opposition with respective ones of the switching devices. An inductor is coupled between a junction of the first and second switching devices and a junction of the third and fourth switching devices. Gating pulses supplied by a gating circuit selectively enable operation of the switching devices for transferring power between the voltage sources. In the second embodiment, each switching device is shunted by a capacitor and the switching devices are operated when voltage across the device is substantially zero.

19 Claims, 11 Drawing Sheets

BIDIRECTIONAL BUCK BOOST CONVERTER

The U.S. Government has a paid-up license in this invention and the right in limited circumstances to require the patent owner to license others on reasonable terms as provided for by the terms of Contract No.: DEAC0363 CH10093 awarded by the U.S. Department of Energy.

BACKGROUND OF THE INVENTION

This invention relates to direct current to direct current power conversion systems and, more particularly, to a bidirectional buck boost converter for controlling power flow between two voltage sources without any constraints on relative voltage levels and power flow direction.

Bidirectional buck boost converters are utilized to control and regulate power flow from one voltage level to another in a direct current (dc) distribution system such as that used in electric vehicles, a dc bus for adjustable speed inverter drives, energy storage for active power filtering, and load balancing, as well as other applications. In such applications, there are no constraints placed on the relative voltage levels and power flow may be from a high to a lower level or from a low to a higher level. Furthermore, the voltage levels at either side of the converter can change widely and rapidly, without affecting power flow direction.

One example of utilization of a bidirectional buck boost converter is for connection of an auxiliary passive energy source to a dc bus of an inverter drive circuit, such as shown in U.S. Pat. No. 5,373,195; however, the converter illustrated in that patent does not have buck boost capability even though it functions bidirectionally. The maximum voltage level which can be stored on the passive energy device shown in the patent, such as the ultracapacitor, is limited to the voltage on the dc bus coupled to the inverter; i.e., power cannot be transferred from the bus to the energy storage device once the device has charged to the same voltage as the dc bus. A buck boost converter in such application would be particularly useful in situations where an electric vehicle is operating in a regenerative mode with a very low battery voltage (battery discharged). To protect the battery, the applied voltage must be somewhat lower than the maximum voltage, which would limit the voltage on the passive energy storage device with the boost capability. Power would still be available for transfer to the secondary energy storage device even if the energy storage device were already charged to a voltage higher than the motor voltage.

SUMMARY OF THE INVENTION

Among the several objects of the present invention may be noted the provision of a bidirectional buck boost converter operable to transfer power from one voltage level to another voltage level without being constrained by the relative voltage levels or the direction of power flow. The invention further involves provision of a bidirectional buck boost converter which enables switching of a plurality of electronic switching devices forming the converter during time periods when voltage across the switching devices is substantially zero. Throughout the description herein, reference to direction of current flow is to conventional current, which passes from a relatively positive voltage to a relatively negative voltage.

In an illustrative form, the invention contemplates a buck boost converter comprising a first pair of electronic switching devices coupled in series across a first voltage source and a second pair of electronic switching devices coupled in series across a second voltage source. A junction intermediate the first pair of switching devices is coupled to a junction intermediate the second pair of switching devices through an inductor. Either the negative or positive terminal of each pair of voltage sources is common. Each of the switching devices is bypassed by a corresponding, reversely-poled diode, respectively, to allow current flow in a direction opposite to normal current flow through the switching device. In another embodiment, which enables soft switching of the switching devices, each of the switching devices is bypassed by a corresponding capacitor, respectively. By enabling switching of the switching devices in preselected sequences and combinations, power can be transferred from one voltage source to the other without regard to relative magnitude of voltage at the two voltage sources. More particularly, the system can be operated such that if the first voltage source is of greater magnitude than the second voltage source, power flow can be enabled from the first voltage source to the second voltage source through the inductor and, if power flow is desired from the second voltage source to the first voltage source, the converter can act as a boost converter to cause power to flow in a reverse direction through the inductor and charge the first voltage source to even higher levels. For soft switching, the capacitors in parallel with the switching devices provide current through the inductor and operate in conjunction with the inductor to form a ringing circuit that allows each of the switching devices to be switched into and out of conduction at times when voltage across the switching device is substantially zero.

The inverter operates in a buck mode when the voltage of the first voltage source is larger than the voltage of the second voltage source and power flow is desired from the first source to the second source. In such condition, the switch coupled to the positive terminal of the second voltage source, hereinafter the third switch, is maintained in an on condition, and the switch coupled to the negative terminal of the second voltage source, hereinafter the fourth switch, is maintained in a non-conducting mode. The switch coupled to the positive terminal of the first voltage source, hereinafter the first switch, is initially gated on so that current flows to the first switch, the inductor and the third switch. The voltage developed across the inductor is essentially equal to the difference between the voltages of the first and second sources and current builds up in the inductor in a direction from the first source to the second source. Current control is initiated by gating the first switch out of conduction and gating the switch coupled to the negative terminal of the first voltage source, hereinafter the second switch, into conduction so that the voltage across the inductor reverses polarity and is equal to the voltage of the second source. Current through the conductor thus starts decreasing. Control of the current is then achieved by varying the relative time durations of the first and second phases of operation. If the voltage of the first source is only slightly larger than the voltage of the second source, improved current control can be obtained by adding a third phase of operation in which only the first switch and the fourth switch are in conduction so that the voltage across the inductor is equal to that of the first voltage source and is therefore much larger than the voltage difference between the two voltage sources. The inductor current ramps up extremely fast and current control is achieved by varying the relative time durations of the three phases.

The converter operates in a boost mode when the voltage of the first voltage source is greater than the voltage of the second voltage source and power transfer is from the second source to the first source. In this mode of operation, the third switch is placed in conduction and the fourth switch is made non-conductive. The second switch is then gated into conduction during a first phase so that current increases in the inductor in a direction from the second voltage source. In a subsequent phase, the second switch is gated out of conduction and the first switch is gated into conduction so that the inductor current is fomed through the diode, bypassing the first switch, into the first voltage source. However, because the voltage across the inductor is now reversed from its initial or first phase state, inductor current begins to decrease. Control of the current can be achieved by varying the relative time duration of the two phases. If the voltage of the first voltage source is only slightly larger than the voltage of the second voltage source, a third phase of operation can be introduced to bring up the current faster than possible in the second phase of operation. In particular, in a third phase of operation, the first and fourth switches are gated into conduction with the second and third switches out of conduction so that voltage across the inductor becomes equal to the voltage of the first voltage source, forcing the inductor current to decrease rapidly. Current control is still achieved by varying the time duration of each of the three phases of operation.

In another mode of operation, the converter acts as a boost converter when the voltage of the second voltage source is larger than the voltage of the first voltage source and power flow is desired from the first vokage source to the second voltage source. In a first phase of operation in this mode, the first switch is in conduction and the fourth switch is gated into conduction to allow current to increase through the inductor from the first voltage source. In a second phase of operation in this mode, the fourth switch is gated out of conduction and the third switch is gated into conduction so that inductor current is forced through the diode in parallel with the third switch and into the second voltage source. By varying the relative time duration of the two phases in this mode of operation, current control can be achieved. Moreover, if the voltage of the second voltage source is only slightly larger than the voltage of the first voltage source, the converter can be operated with an additional phase which allows inductor current to be changed very rapidly. The third phase is initiated by gating the second and third switches into conduction so that the inductor voltage now corresponds to the voltage of the second voltage source, causing the inductor current to ramp down at a very high rate. Current control can be achieved by varying the relative time duration of each of the phases.

In still another mode of operation, the converter acts as a buck converter when the voltage of the second voltage source is larger than that of the first voltage source and power transfer is desired from the second voltage source to the first voltage source. Initially, the first switch is placed in conduction with the second switch in a non-conducting condition. In a first phase of this mode, the third switch is gated into conduction so that the inductor voltage is equal to the difference between the voltages of the first and second voltage sources and current in the inductor is increasing in a direction from the second source to the first source. In a subsequent phase of operation, the third switch is gated out of conduction and the fourth switch is gated into conduction so that the inductor voltage reverses polarity and inductor current begins to decrease. In a further modification of this mode of operation, a third phase is implemented in which the second and third switches are gated into conduction alone and the inductor voltage becomes equal to the voltage of the second source. Current through the inductor increases so that re-entering the first phase occurs with a substantial current flowing in the inductor. Current control is again achieved by varying the relative time duration of each of the three phases.

It will be noted that there are no constraints to changing any of the operation modes described above. The operation modes are distinguished by the relative voltage difference in the power flow direction. In a circuit in which the capacitors are coupled in parallel with each of the switching devices, the time of switching each of the various switches into and out of conduction can be adjusted so that switching occurs when voltage across a selected switch is essentially zero. Accordingly, the converter circuit including resonance capacitors in parallel with each of the switches provides for a soft-switched converter that does not electrically stress the switching devices.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

Figure 1:
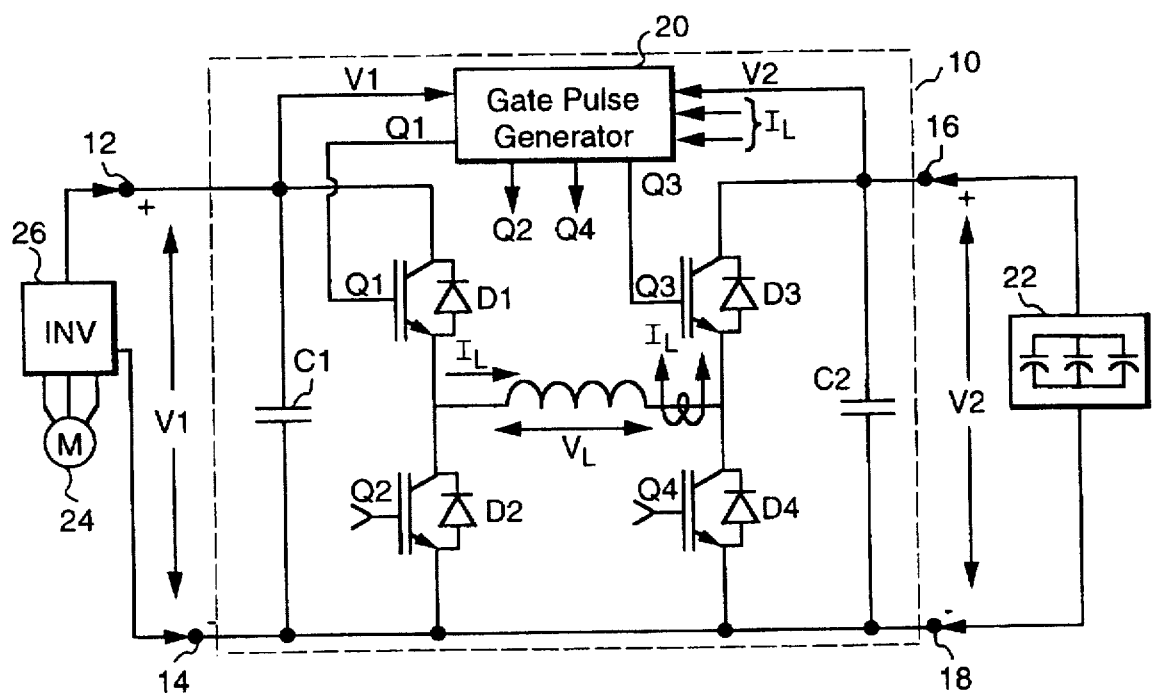
FIG. 1 is a simplified schematic diagram of a first embodiment of a bidirectional buck boost converter in accordance with the present invention.

FIG. 1 is a simplified schematic representation of a bidirectional buck boost converter 10 in accordance with one form of the present invention. The converter comprises a first switching device Q1 serially coupled to a second switching device Q2 with the series combination of devices Q1 and Q2 coupled across a first voltage source represented by a capacitor C1 at a voltage V1. The first voltage source includes a positive terminal 12 and a negative terminal 14. The converter further includes a third switching device Q3 serially coupled to a fourth switching device Q4 with the series combination of devices Q3 and Q4 coupled across a capacitor C2 which represents a second voltage source at a voltage V2. The second voltage source includes a positive terminal 16 and a negative terminal 18. An inductor L is coupled between a junction intermediate devices Q1 and Q2 and another junction intermediate devices Q3 and Q4. Negative terminals 14 and 18 are connected in common, although in the alternative, positive terminals 12 and 16 might be connected in common instead. Switching devices Q1–Q4 are shown as insulated gate bipolar transistors (IGBT) by way of example, but other devices with turn on and turn off capability such as MOSFETs, MCTs and GTOs could be used instead for devices Q1–Q4. Each of devices Q1–Q4 is bypassed by a corresponding one of a plurality of reversely-poled diodes D1–D4 to provide a reverse current path bypassing each of the switching devices.

Devices Q1–Q4 may be controlled by a conventional gate pulse generator 20 of a type well known in the art. The gate pulse generator may be responsive to conditions of various input signals including the magnitude and direction of current through inductor L, the magnitude of voltage at each of voltage sources V1 and V2, and external commands indicating the level of voltage to be developed at either of voltage sources V1 or V2. For exemplary purposes, it will be assumed that voltage source V2 is an ultracapacitor bank 22 used as an auxiliary energy storage device for supplying power to, and receiving power from, a motor 24 which can be operated in either a motoring or generating mode. An inverter 26 is coupled to the motor. In the normal motoring mode, energy may be transferred from ultracapacitor bank 22 through converter 10 to inverter 26 to provide additional power to motor 24. Terminals 12 and 14, in addition to being coupled to inverter 26, may also be coupled through another converter (not shown) to a primary power source for motor 24, such as a battery. When the motor is operated in a regenerative mode, power is supplied through the inverter to terminals 12 and 14 and can be transferred through converter 10 to ultracapacitor bank 22. The voltage at terminals 12 and 14 can vary over a wide range and the voltage at terminals 16 and 18 can similarly vary over a wide range. During regenerative operation of motor 24, the voltage V1 may initially become larger than voltage V2, yet it may be desirable to charge ultracapacitor bank 22 to a voltage higher than voltage V1. To accomplish this, converter 10 must be operable to transfer power from terminals 12 and 14 to terminals 16 and 18 regardless of the relative magnitudes of voltages V1 and V2. Conversely, in the motoring mode, voltage V2 may initially be high and then drop off as ultracapacitor 22 discharges, causing a change in relative magnitude of voltages V1 and V2. However, it remains desirable to continue to transfer power from ultracapacitor bank 22 to motor 24 even though voltage V2 may be less than voltage V1.

Figure 2:
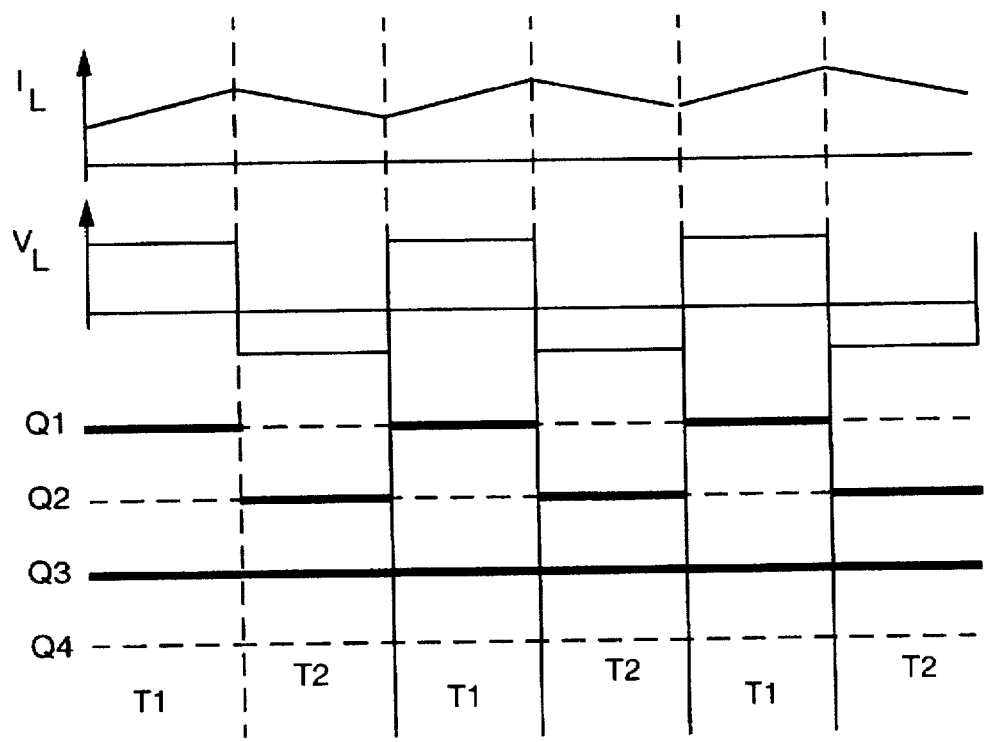
FIG. 2 is a simplified schematic diagram of a second form of a bidirectional buck boost converter incorporating soft switching of the switching devices in accordance with another form of the invention.

FIG. 2, illustrates one method of operation of converter 10 of FIG. 1 when voltage V1 is larger than voltage V2 and power is being transferred from V1 to V2. Device Q3 is initially placed into a continuously conducting mode and device Q4 is placed into a nonconducting mode. In FIG. 2 as well as in all subsequent figures, a state of conduction is illustrated by a solid line and a state of nonconduction is illustrated by dashed or phantom lines. During a first time interval T1, converter 10 is operated in a first phase in which device Q1 is gated into conduction so that current passes through device Q1, inductor L and diode D3 in parallel with switching device Q3 to ultracapacitor 22. During a second time interval T2, a second phase of operation is initiated in which device Q1 is gated out of conduction and device Q2 is gated into conduction. During this phase, current $I_L$ through inductor L begins to decrease since the voltage impressed across the inductor is V2, but is reversed in polarity from the voltage impressed across the inductor when device Q1 is conducting. Voltage $V_L$ across inductor L when devices Q1 and Q3 are conducting is the difference between voltages V1 and V2. With devices Q2 and Q3 conducting, voltage $V_L$ is voltage V2. The corresponding voltage and current waveforms are shown at $I_L$ and $V_L$ in FIG. 2 and indicate that during the first phase of operation current increases through the inductor to some selected value, at which time device Q1 is switched out of conduction and device Q2 switched into conduction. Current $I_L$ then begins to decrease down to a second lower level. The average value of current through inductor L can be established by varying the relative time intervals T1 and T2 corresponding to phase 1 and phase 2 of operation.

Figure 2A:
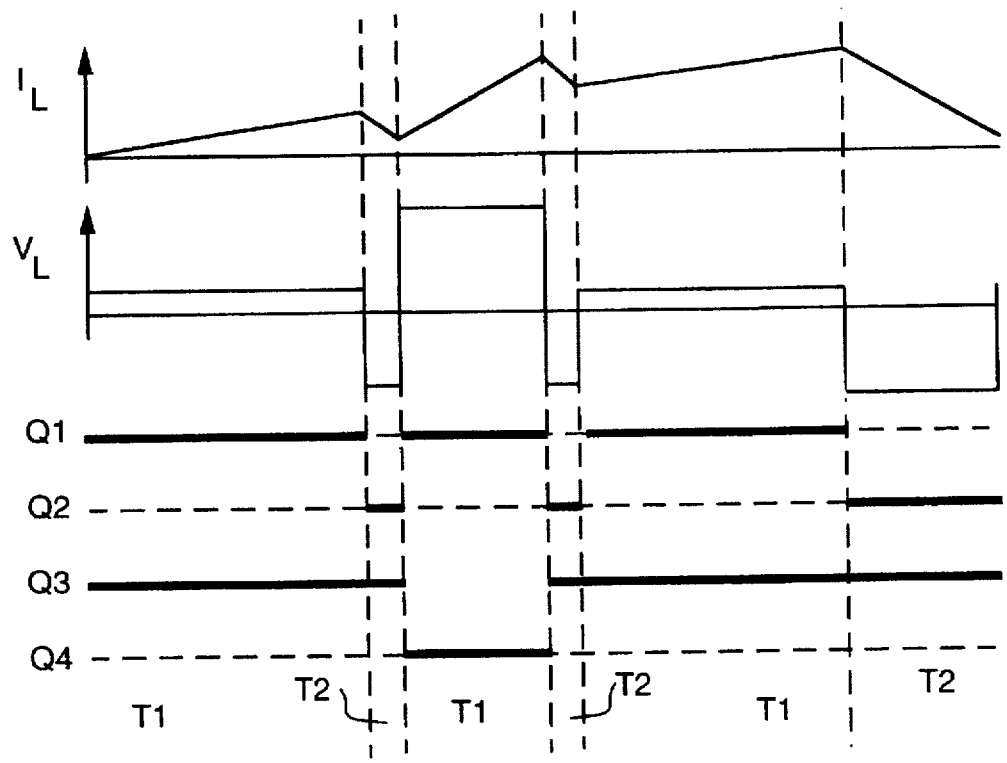

FIG. 2A illustrates an alternative method of operating converter 10 of FIG. 1 when the voltage V1 is only slightly larger than voltage V2 and power is still being transferred from voltage V1 to voltage V2. In this operation mode, the converter acts as a buck converter with switches Q1 and Q3 conducting during a first phase of operation. During this initial phase, current builds up in inductor L, as shown by the graph at $I_L$, until some preselected value is achieved at which time the switching devices are gated such that device Q1 becomes non-conductive and devices Q2 and Q3 are conductive. At this time, the voltage across inductor L is reversed and current begins to decrease. At a preselected value, switching devices Q2 and Q3 are gated out of conduction and switching devices Q1 and Q4 are gated into conduction. This action impresses the full magnitude of voltage V1 across inductor L and causes current $I_L$ to increase at a much higher rate. Once current $I_L$ has built to a preselected value, switching devices Q1 and Q4 are gated out of conduction and devices Q2 and Q3 are gated into conduction for a short time interval, which allows the current in inductor L to begin to decrease. Thereafter, phase 1 is again repeated such that devices Q2 and Q4 are nonconductive and devices Q1 and Q3 are conductive. Due to the inductive reactance of inductor L, current continues through the inductor and begins to increase even though voltage $V_L$ across the inductor is relatively small. The difference between the method of operation illustrated in FIG. 2 and the method illustrated in FIG. 2A is the addition of a third phase during a time period T3 in which the current through the inductor is forced to increase to a higher level by voltage V1 having been impressed across the inductor.

Figure 3:
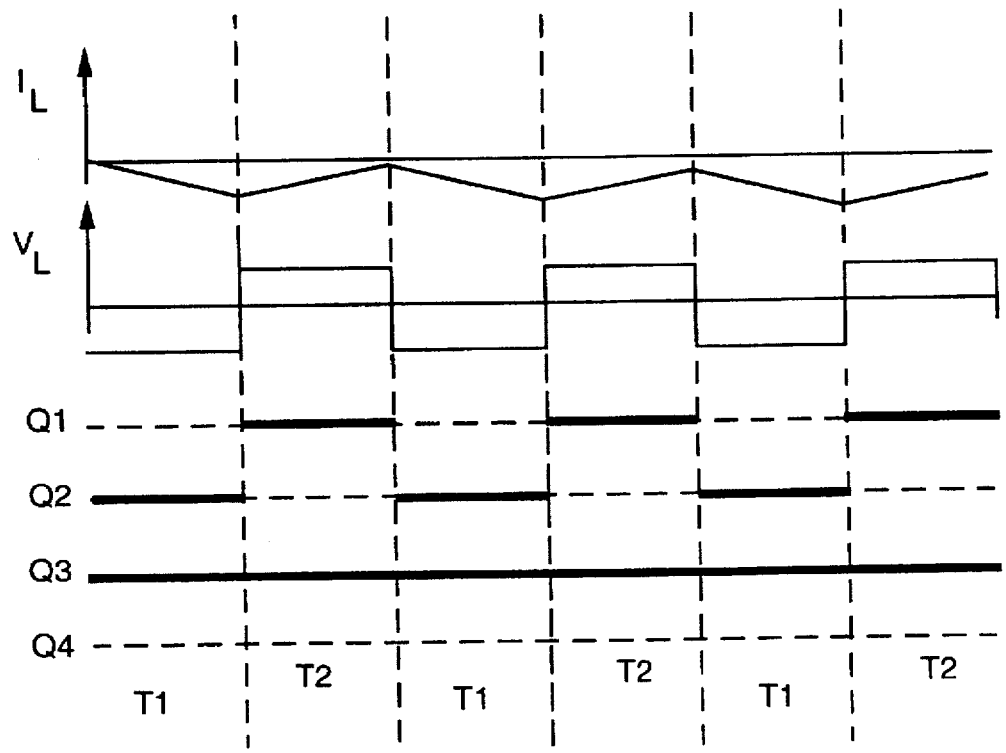
FIGS. 3–5A are graphical illustrations of various modes of operation of the circuit of FIG. 1.

FIG. 3 illustrates a second mode of operation in which voltage V1 is larger than voltage V2 but power is desired to be transferred from V2 to V1. In this mode of operation, the converter acts as a boost converter, with switching device Q3 being continuously conductive and switching device Q4 being non-conductive. During a first phase, indicated at time period T1, device Q1 is non-conducting and device Q2 is conducting. Current flows through inductor L in a reverse direction since voltage V2 is impressed across the inductor. When the current reaches a preselected value, device Q2 is switched out of conduction and device Q1 into conduction such that the voltage impressed on inductor L is reversed and is equal to the difference between voltages V1 and V2. Inductive reactance maintains current flow in the same reverse direction through inductor L at a gradually decreasing amplitude until, at some selected minimum value, the status of each of switching devices Q1 and Q2 is again reversed so that device Q1 is non-conductive and Q2 is conductive, applying voltage V2 across inductor L so that current increases through the inductor. By varying the relative time duration between the times T1 and T2 of phase 1 and phase 2 respectively, the average value of current transferred from voltage V2 to voltage V1 can be controlled.

Figure 3A:
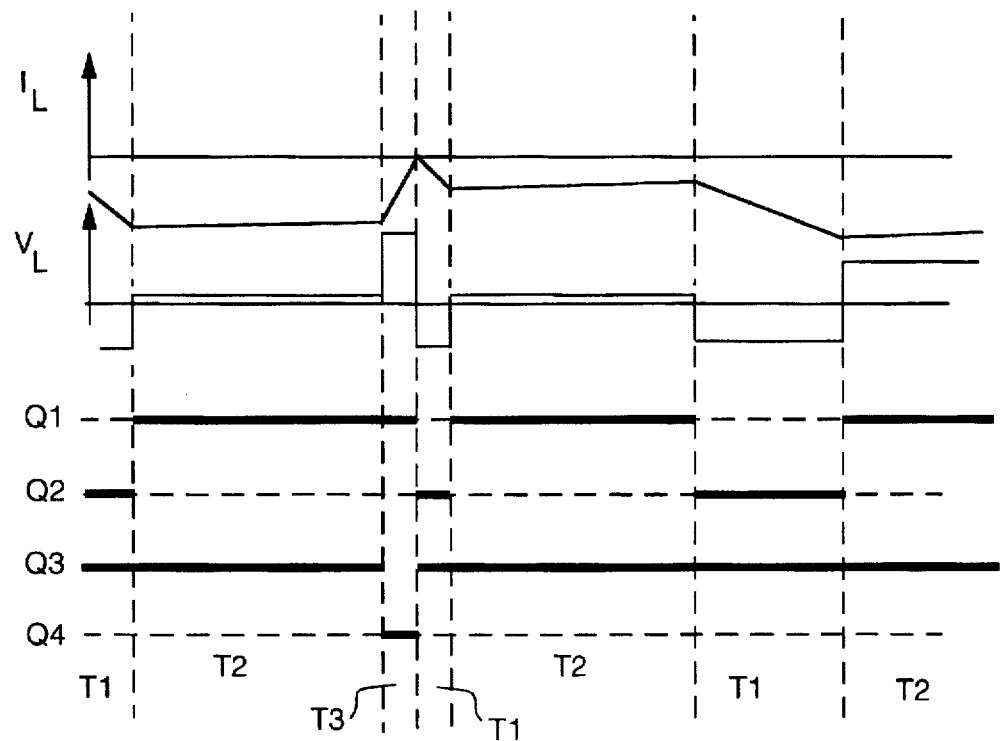

In situations where voltage V1 is only slightly larger in amplitude than voltage V2, current control can be improved by adding another phase of operation. As evident from FIG. 3A, phase 1 operation and phase 2 operation remain the same as described in FIG. 3. More particularly, during phase 1 (time T1), devices Q2 and Q3 are conductive and devices Q1 and Q4 are non-conductive. Current builds up in inductor L in a negative direction to some selected value. In phase 2 (time T2), device Q1 is switched into conduction along with device Q3 and devices Q2 and Q4 are switched out of conduction. Because there is only a small difference between voltages V1 and V2, the voltage through the inductor decreases at a slower rate. In order to provide a rapid decrease in current through inductor L, devices Q1 and Q4 can be made conductive with devices Q2 and Q3 being non-conductive such that the full value of voltage V1 is impressed across inductor L during an added phase (time T3). As shown in the waveform of $I_L$, current through the inductor rapidly decreases. At a selected current value, devices Q1–Q4 can be switched back to phase 1 operation, with Q2 and Q3 conductive and Q1 and Q4 non-conductive, so that current is increased in a negative direction through inductor L. Inclusion of the additional phase 3 allows the current to be rapidly decreased and provides better control for establishing an average current through inductor L.

Figure 4:
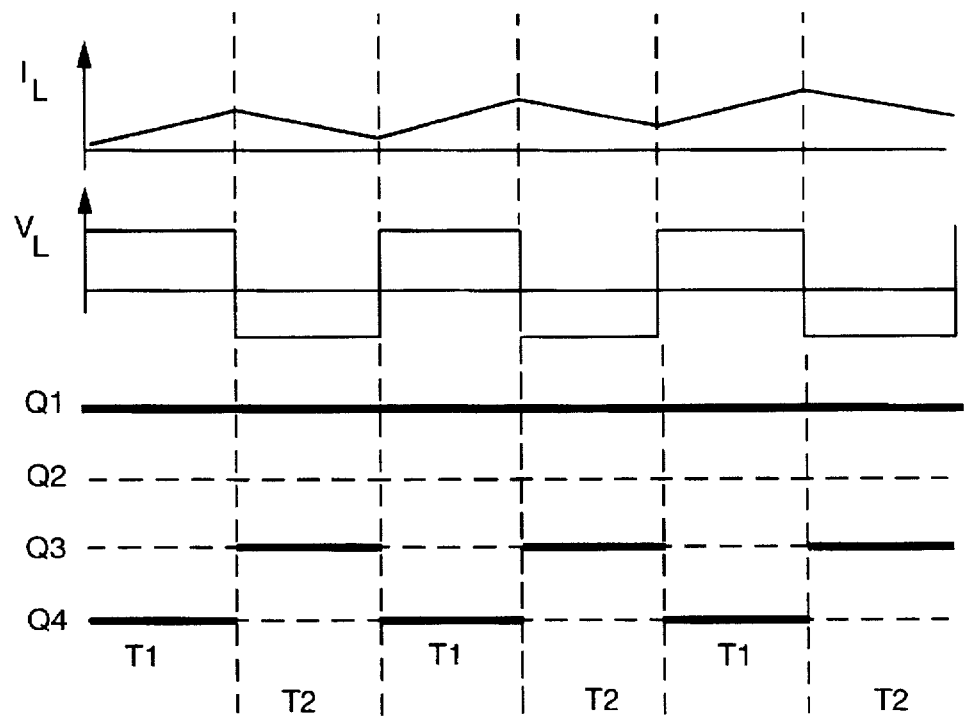

Another mode of operation for converter 10 occurs when voltage V2 is larger than voltage V1 and power flow is desired from voltage V1 to voltage V2. In this mode of operation, illustrated in FIG. 4, the converter acts as a boost converter with switching device Q1 continuously conductive and switching device Q2 non-conductive. During a first phase, occurring at time T1, device Q4 is made conductive so that voltage V1 is impressed across inductor L and current begins to increase in a positive direction, i.e., in the direction of the arrow $I_L$ in FIG. 1, until the current reaches some preselected value. During a second time interval T2, a second phase of operation occurs in which device Q3 is conductive and device Q4 is non-conductive. The voltage impressed across inductor L then becomes the voltage difference between voltage V1 and voltage V2. Since V1 is smaller than V2, the voltage across inductor L is reversed and current $I_L$ begins to decrease. Phases 1 and 2 are then repeated to establish an average value of current in inductor L. By varying the relative time durations of phases 1 and 2, the average value of current in inductor L can be controlled.

Figure 4A:
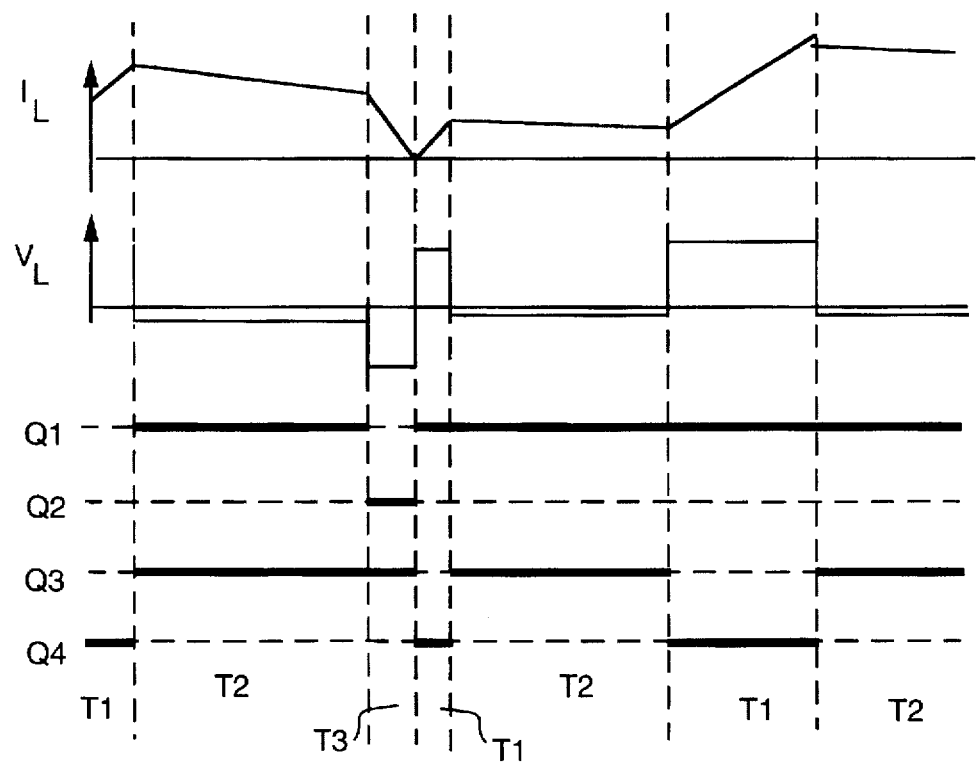

If voltage V2 is only slightly larger than voltage V1, control of the average value of current $I_L$ can be improved by adding an additional phase of operation indicated at T3 in FIG. 4A. The first and second phases of operation remain the same as in FIG. 4 but, at the added third phase, switching device Q1 is taken out of conduction along with device Q4 and devices Q2 and Q3 are made conductive. With devices Q2 and Q3 conductive, the full voltage available at V2 is impressed across inductor L, causing the current in the inductor to rapidly decrease. At some selected value, for example, zero current, as shown in FIG. 4A, phase 3 is terminated and phase 1 is again initiated to allow current to build up in inductor L. Without using phase 3, current in inductor L would not decrease at a rapid rate and control would require relatively short time intervals for the phase 1 operation and relatively long time intervals for the phase 2 operation. By introducing the additional phase 3, better control of average current magnitude can be achieved.

Figure 5:
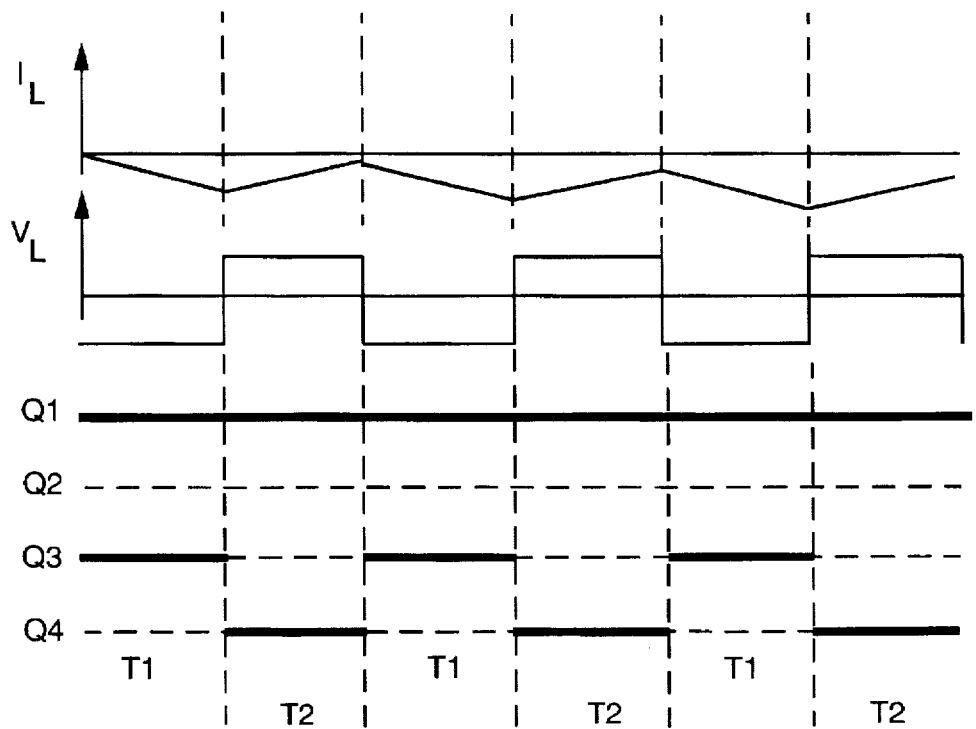

Still another mode of operation of converter 10 of FIG. 1 is illustrated in FIG. 5 in which voltage V2 is larger than voltage V1 and power transfer is to occur from passive energy storage device 22 to motor 24, i.e., power is to be transferred from voltage V2 to voltage V1. In this mode, the converter acts as a buck converter with switching device Q1 continuously on and switching device Q2 continuously off. During a first phase of operation at time T1, device Q3 is gated into conduction so that voltages impressed across inductor L is the difference between voltages V1 and V2. With voltage V2 being larger than V1, current builds up in inductor L in a negative direction. During a second phase of operation at time T2, device Q3 is switched out of conduction and device Q4 switched into conduction so that voltage V1 is impressed across the inductor and effectively reverses the voltage $V_L$. Current $I_L$ begins to decrease in the inductor. At some preselected value, the second phase is terminated and the first phase of operation resumes. The average magnitude of current in inductor L is then controlled by varying the relative time durations of phases 1 and 2 as they are sequentially repeated.

Figure 5A:
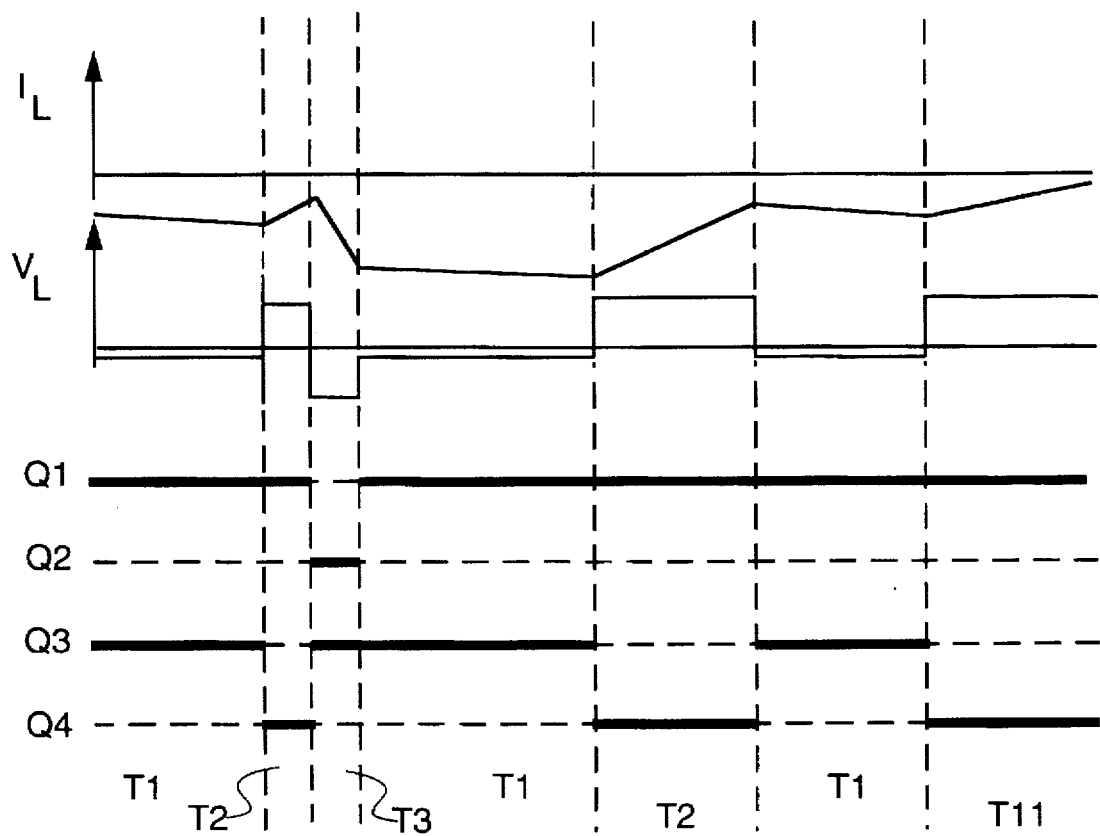

If voltage V2 is only slightly larger than voltage V1, current control can be improved by adding a third phase of operation, as shown in FIG. 5A, in which voltage V2 is impressed across inductor L. In FIG. 5A, the first and second phases of operation are the same as shown in FIG. 5. During a time T3, phase 3 of operation is initiated in which device Q4 is gated out of conduction along with device Q1, and devices Q2 and Q3 are now in conduction. With devices Q2 and Q3 in conduction, the voltage across inductor L is voltage V2, causing current in inductor L to increase rapidly in a negative direction. Phase 3 brings up the current much faster than possible in phase 1 wherein the voltage across the inductor is simply the difference between voltages V1 and V2. Control of current $I_L$ is achieved by varying the relative time duration of phases 1, 2 and 3. As evident from FIG. 5A, phase 3 may be reduced to a zero time interval if control is adequate with phases 1 and 2. The converter of FIG. 1 provides the functions necessary to transfer power bidirectionally between voltages V1 and V2 irrespective of the relative magnitude of the two voltages. However, converter 10 of FIG. 1 requires that switching devices Q1–Q4 switch while voltage exists across the devices, and is therefore subject to switching losses.

Figure 6:
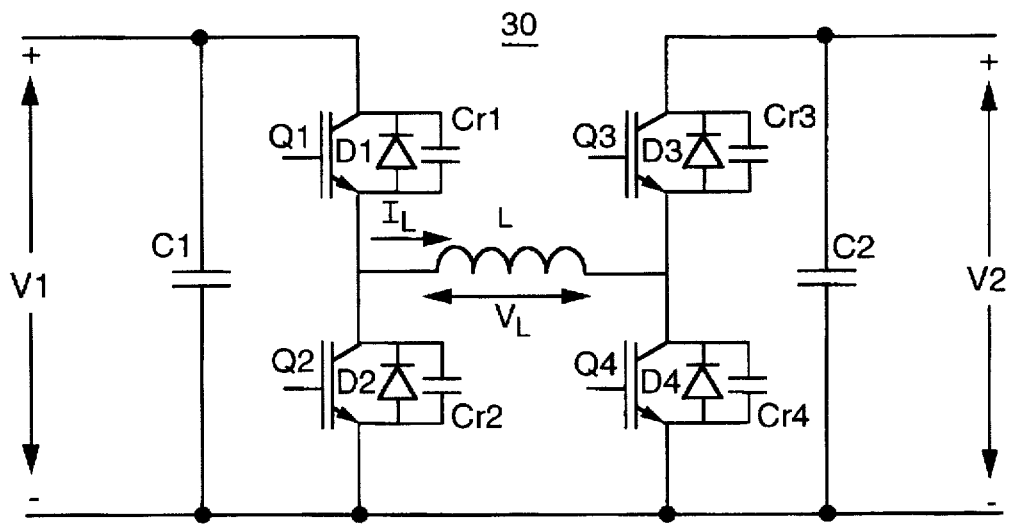

FIG. 6 illustrates a modified buck boost converter 30 for providing soft switching of switching devices Q1–Q4; i.e., switching of the devices at a time when voltage across the devices is substantially zero. The soft switching should reduce switching losses in the converter by about thirty percent. Converter 30 achieves soft switching by adding a resonant capacitor Cr1–Cr4, respectively, in parallel with a respective one of switching devices Q1–Q4. The remaining portions of the circuit of FIG. 6 are substantially identical to the circuit shown in FIG. 1, although the modes of operation are somewhat different.

FIGS. 7–10A illustrate various modes of operation of converter 30 depending upon whether voltage V1 is larger or smaller than voltage V2 and whether current is to be transferred from voltage V1 to V2 or vice versa.

Figure 7:
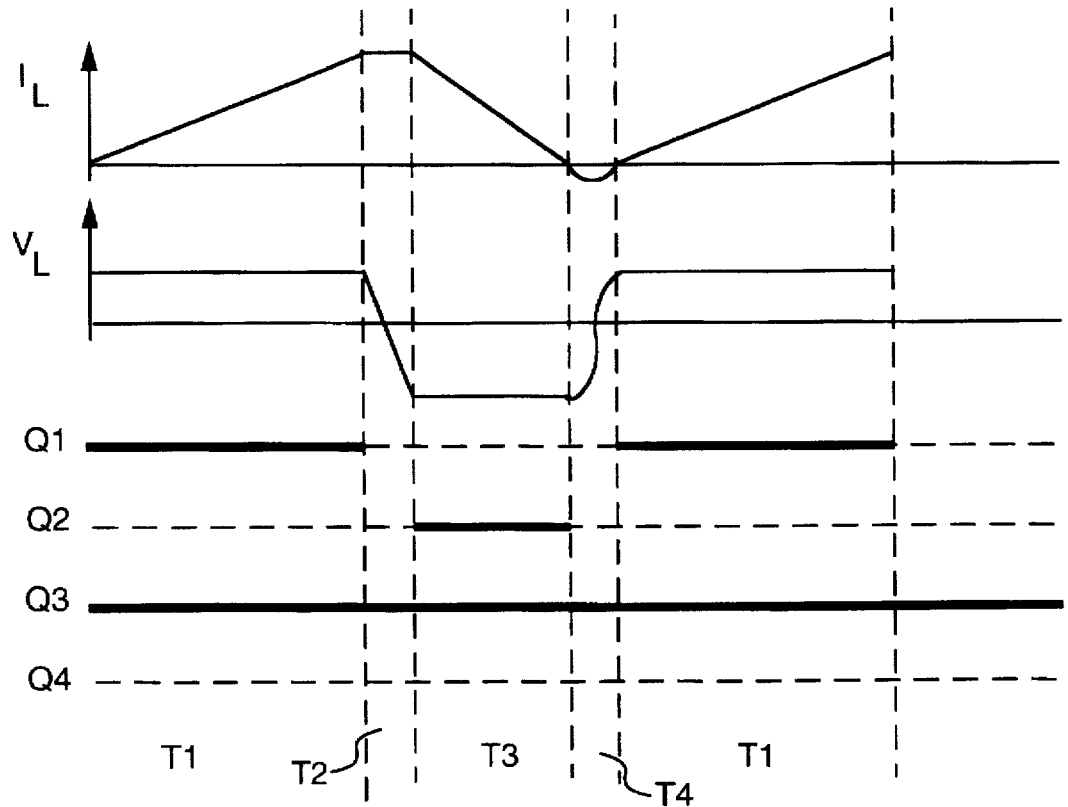
FIGS. 7–10A are graphical illustrations of various modes of operation of the circuit of FIG. 6.

FIG. 7 illustrates a mode of operation in which voltage V1 is larger than voltage V2 and power is to be transferred from voltage V1 to voltage V2. Beginning at time T1, a first phase occurs in which switching devices Q2 and Q4 are maintained in a non-conductive mode and devices Q1 and Q3 are made conductive. The voltage $V_L$ impressed across inductor L is positive in the sense that it is V1 minus V2 and V1 is larger than V2. Current builds up in a positive direction in inductor L as shown by the curve of $I_L$. At the end of phase 1, device Q1 is gated into a non-conductive mode in a loss-free switching action since the voltage across the device is substantially equal to zero. This action initiates phase 2 (time T2). The current in inductor L is immediately taken over by capacitors Cr1 and Cr2 as capacitor Cr1 is being charged by current from V1 to inductor L and capacitor Cr2 is discharged through inductor L. At the beginning of time T3, the voltage on capacitor Cr1 has reached the voltage available from source V1 and the voltage across capacitor Cr2 has been reduced to zero. The diode of switch Q2 then starts to conduct in order to continue to supply the inductive current. During phase 3 (time T3), the voltage across inductor L becomes negative and is equal to voltage V2. This causes current $I_L$ in inductor L to begin rapidly decreasing. Phase 3 is terminated when inductor current $I_L$ becomes zero. At that time a new phase 4, (time T4) is initiated in which the inductor and capacitors Cr1 and Cr2 form a ringing circuit forced by voltage V2 that creates a negative current in inductor L as indicated by the $I_L$ waveform. Since device Q3 is conducting, voltage V2 forces the ringing current, allowing capacitor Cr2 to be charged. The voltage across capacitor Cr2 can swing up to a maximum of either two times V2 or the value of V1, whichever occurs first. At this time, switch Q1 can be turned on without any losses if the value of the voltage on capacitor Cr2 is V1 since the voltage and current across switch Q1 are then zero. Some loss will occur if the voltage two times V2 is substantially less than voltage V1. Current control is achieved by varying the relative time duration of phases 1 and 3. In this mode of operation, soft switching is assured for switching off device Q1, but switching losses in device Q1 during switching to a conductive condition are only assured if voltage V2 is larger than one-half of voltage V1.

Figure 7A:
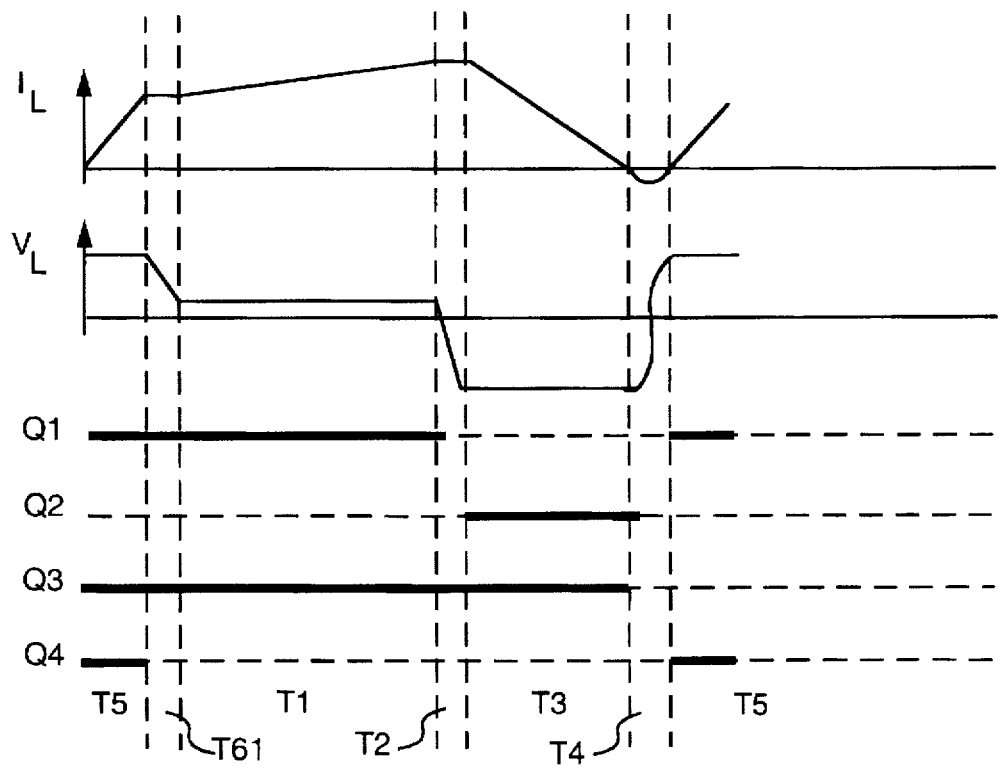

Better control of the current in inductor L can be realized by adding additional phases of operation for the case in which voltage V1 is only slightly larger than voltage V2. Thus, as shown in FIG. 7A, phases 1, 2 and 3 remain the same as described in conjunction with FIG. 7, but new phases 5 (T5) and 6 (T6) are added to the operation. In addition, in phase 4, device Q3 is gated out of conduction. In phase 5, switching devices Q1 and Q4 are gated into conduction and devices Q2 and Q3 are maintained non-conductive. Voltage VL across inductor L is positive and current builds up in inductor L in a positive direction. The voltage across inductor L is equal to voltage V1, which causes a rapid current build up. In phase 6, device Q4 is switched out of conduction in a loss-free switching action since the voltage across the device is substantially zero at this time. Current $I_L$ is immediately taken over by capacitors Cr3 and Cr4 with capacitor Cr4 being charged at the same time that capacitor Cr3 is being discharged. At the time that voltage on capacitor Cr4 is equal to voltage V2 and voltage across capacitor Cr3 is equal to zero, the diode across device Q3 starts to conduct. This action leads into phase 1 where voltage across inductor L is still positive, i.e., $V_L$ is equal to V1 minus V2, but small, and current IL increases. In phase 2, device Q1 is switched off under loss-free conditions since the voltage across the device at that time is essentially zero. The current is then conducted by capacitors Cr1 and Cr2 as described with regard to FIG. 7, with capacitor Cr1 being charged while at the same time capacitor Cr2 is being discharged. At a time when the voltage on capacitor Cr1 is equal to voltage V1 and the voltage across capacitor Cr2 is equal to zero, diode D2 across device Q2 starts to conduct. This leads into a third phase in which the voltage across inductor L is negative and equal to V2 and current in the inductor rapidly decreases. Phase 3 is terminated when current $I_L$ becomes zero, at which time all of the switching devices are in a non-conducting mode. In phase four, inductor L and capacitors Cr1, Cr2, Cr3 and Cr4 form a ringing circuit. The ringing circuit is forced by voltage V2, causing the voltage across capacitor Cr2 to swing up to a maximum of V2 or V1. Voltage across capacitor Cr3 swings up to a maximum of V2. At this time switching device Q4 can be gated into conduction without any losses because current in the device and voltage across the device are zero. The voltage across device Q1 comes down to almost zero with the remaining voltage being the difference between voltages V1 and V2. Control of current in inductor L is achieved by varying the relative time durations of phases 1, 3 and 5. In this mode of operation, soft switching is assured for device Q4 while losses in device Q1 are substantially reduced.

Figure 8:
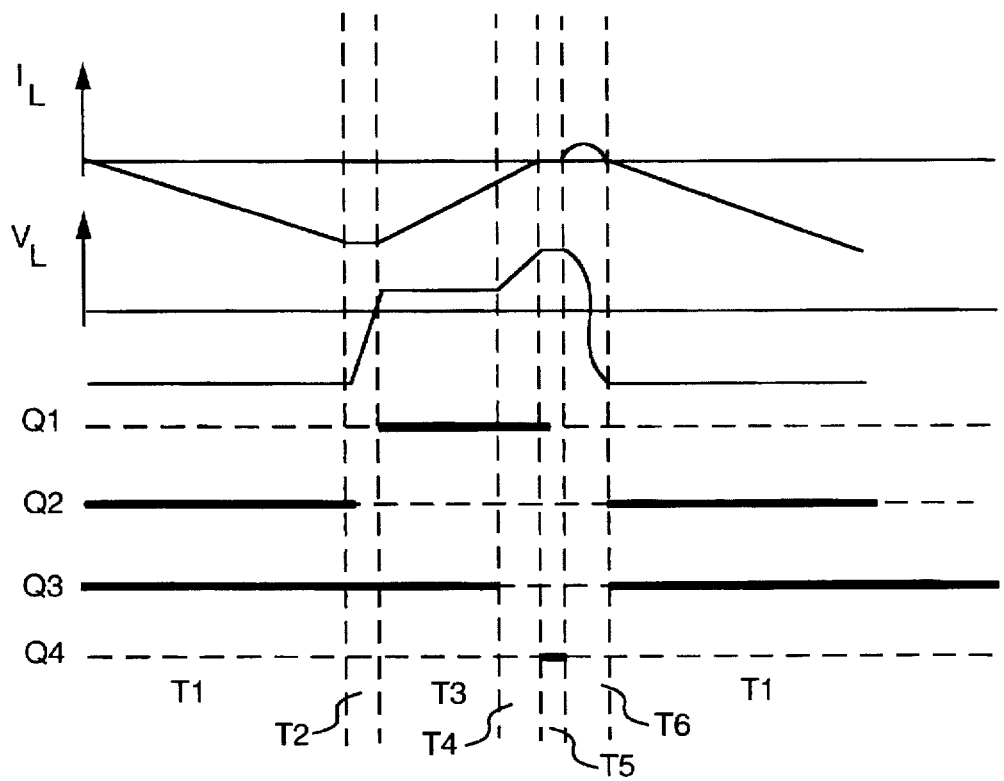

In a situation in which voltage V2 is less than one half the voltage V1 and power is still desired to be transferred from voltage V2 to voltage V1, a slightly different mode of operation can be utilized to minimize switching losses. Thus, as shown in FIG. 8, in a first phase (T1) of operation, switching devices Q1 and Q4 are maintained non-conductive and devices Q2 and Q3 are conductive. The voltage impressed across inductor L is equal to voltage V2 and current increases in a negative direction in inductor L as shown by the waveform of $I_L$. In a second phase T2, device Q2 is gated out of conduction under essentially loss-free conditions since the voltage across the device is substantially zero and current in the device can be conducted by capacitors Cr1 and Cr2. When capacitor Cr2 is charged to voltage V1 and capacitor Cr1 is fully discharged, the diode in parallel with switching device Q1 starts to conduct. This action leads into a third phase of operation (T3) in which voltage across inductor L is positive and equal to the difference between voltages V1 and V2, causing current in the inductor to decrease. Phase 3 is terminated by gating device Q3 out of conduction, with current $I_L$ being conducted by capacitors Cr3 and Cr4. Current $I_L$ decreases to zero while charging capacitor Cr3 and discharging capacitor Cr4. To assure that capacitor Cr4 is fully discharged during phase 4, device Q4 is switched into conduction for a short time interval T5 (phase 5). When device Q4 is switched out of conduction, inductor L and capacitors Cr1, Cr2, Cr3 and Cr4 form a ringing circuit which is forced by voltage V1. Voltage on capacitor Cr1 can swing up to a maximum value of V1, at which time device Q2 can be switched on without loss since voltage across the device and current in the device are zero. Current control is achieved by varying the relative duration of intervals T1 and T3.

Figure 8A:
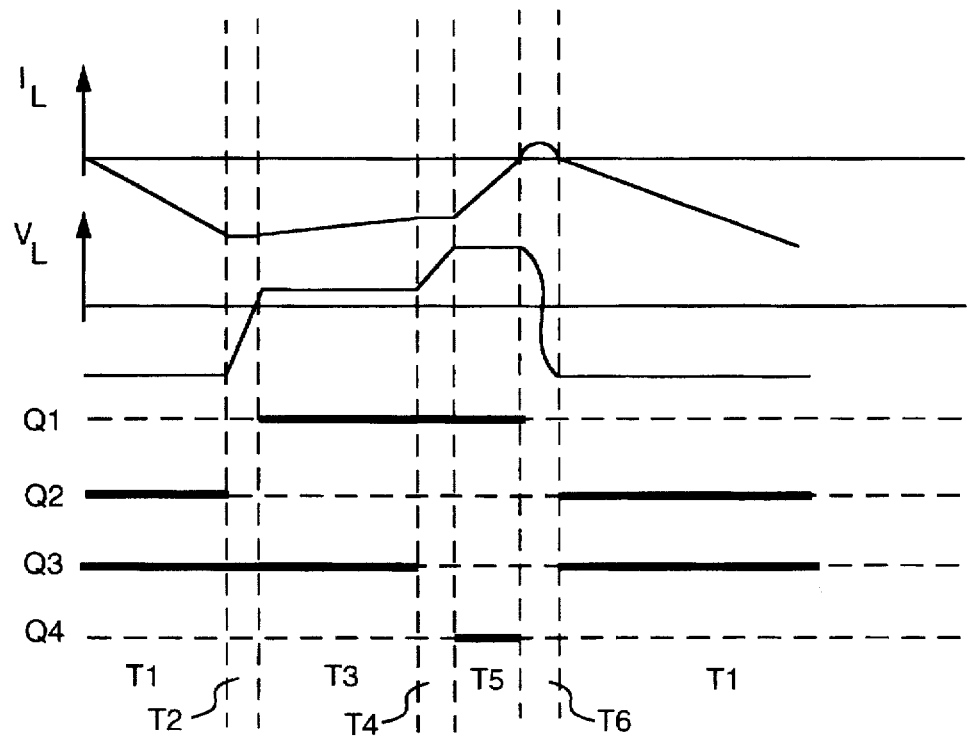

FIG. 8A, illustrates one form of operation of the circuit of FIG. 6 for the case in which voltage V1 is only slightly larger than voltage V2 and power is desired to be transferred from voltage V2 to voltage V1. In this mode of operation, the inductor current is substantially changed by modifying phases 4, 5 and 6. The modification improves current controllability while still allowing the converter to operate as a boost converter. In the first phase, switching devices Q2 and Q3 are conductive just as they were in the FIG. 8 mode of operation. Voltage $V_L$ across inductor L is negative and equal to voltage V2. The inductor increases current in a negative direction as shown by the waveform of $I_L$. At the end of the first phase of operation, device Q2 is gated out of conduction under essentially loss-free conditions since the voltage across device Q2 is substantially zero and the current can be conducted by capacitors Cr1 and Cr2. Capacitor Cr2 is charged and at the same time capacitor Cr1 is discharged. At the time when the voltage on capacitor Cr2 is equal to voltage V1 and the voltage across capacitor Cr1 is equal to zero, diode D1 across switching device Q1 starts to conduct. This action leads into the third phase, wherein voltage across inductor L is positive and equal to the difference between voltages V1 and V2. Since there is a relatively small difference between these voltages, the current decreases but at a slow rate. In phase 4, device Q3 is switched out of conduction, forcing current in the inductor to be conducted by capacitors Cr3 and Cr4. Capacitor Cr3 is charged while capacitor Cr4 is discharged. At the time when the voltage across capacitor Cr3 is equal to voltage V2 and the voltage across capacitor Cr4 is equal to zero, diode D4 across switching device Q4 starts to conduct, as indicated by the conduction of device Q4. During this phase of operation, the voltage across inductor L is positive and equal to voltage V1, and current in the inductor decreases. This fifth phase of operation is terminated when inductor current $I_L$ becomes zero. This action leads into a sixth phase of operation in which all of the switching devices are in a non-conducting state. During this phase of operation, inductor L and capacitors Cr1, Cr2, Cr3 and Cr4 form a ringing circuit. The ringing circuit is forced by voltage V1, and the voltage on capacitor Cr1 swings up to a maximum of voltage V1. Further, the voltage across capacitor Cr4 swings up to a maximum of voltage V1. At this time, switching devices Q2 and Q3 can be turned on without any losses because both voltage across these devices and current in these devices are zero. Switching devices Q2 and Q3 into conduction returns the system to the first phase of operation. Current control is achieved by varying the time duration of phases 1, 2,3 and 4.

Figure 8B:
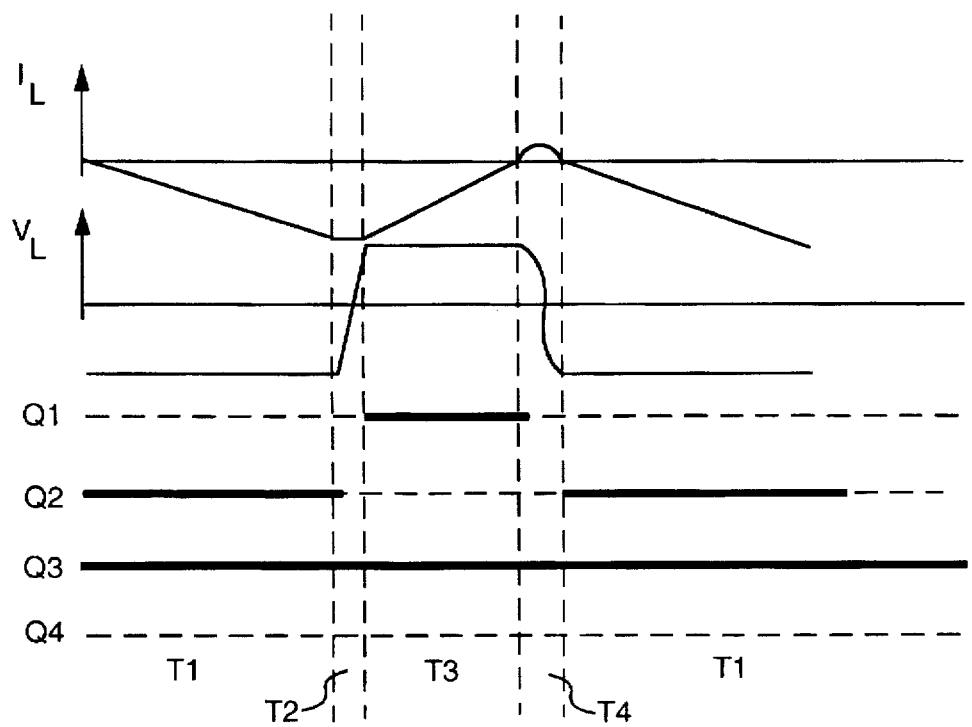

The mode of operation illustrated in FIG. 8A assures soft switching for devices Q2 and Q3, with voltage V1 only slightly larger than voltage V2. FIG. 8B illustrates a mode of operation in which voltage V2 is significantly larger than voltage V1 and power is supplied from voltage V2 to voltage V1. In the illustrated operating mode, switching device Q3 is in conduction all of the time and switching device Q4 is out of conduction at all times. During a first phase of operation at time T1, switching devices Q2 and Q3 are conductive and voltage $V_L$ across inductor L is negative and equal to voltage V2. The current increases in a negative direction as indicated by the waveform of $I_L$. Capacitor Cr1 becomes fully charged to voltage V1 and capacitor Cr2 is discharged. At the end of the phase 1 operation, device Q2 is switched out of conduction with lossless switching and current in the inductor is conducted by capacitors Cr1 and Cr2. Capacitor Cr2 is charged while capacitor Cr1 is discharged. At a time when voltage across capacitor Cr2 is equal to voltage V1 and voltage across capacitor Cr1 is substantially equal to zero, diode D1 across switching device Q1 starts to conduct. This action leads into a third phase of operation in which voltage across inductor L is positive and equal to the difference between voltages V1 and V2, causing current to decrease in inductor L. The third phase of operation is terminated when current $I_L$ becomes zero. In phase 4, inductor L and capacitors Cr1 and Cr2 form a ringing circuit which is forced by the voltage difference V1 minus V2. Diode D3 across switching device Q3 becomes conductive, allowing the voltage across capacitor Cr1 to swing up to a maximum of two times the difference between voltages V1 and V2, or to voltage V1, whichever occurs first. At this time, switching device Q2 can be turned on without any losses because both voltage across the device and current in the device are zero. Current control is achieved by varying the duration of the first and third phases. Thus soft switching is assured for switching device Q2 out of conduction; however, soft switching for switching the device into conduction is assured only if voltage V2 is smaller than one-half V1. If voltage V2 becomes larger than one-half V1, switching losses will occur, although such losses will be less than would occur under purely hard switching without the shunt capacitors.

Figure 9:
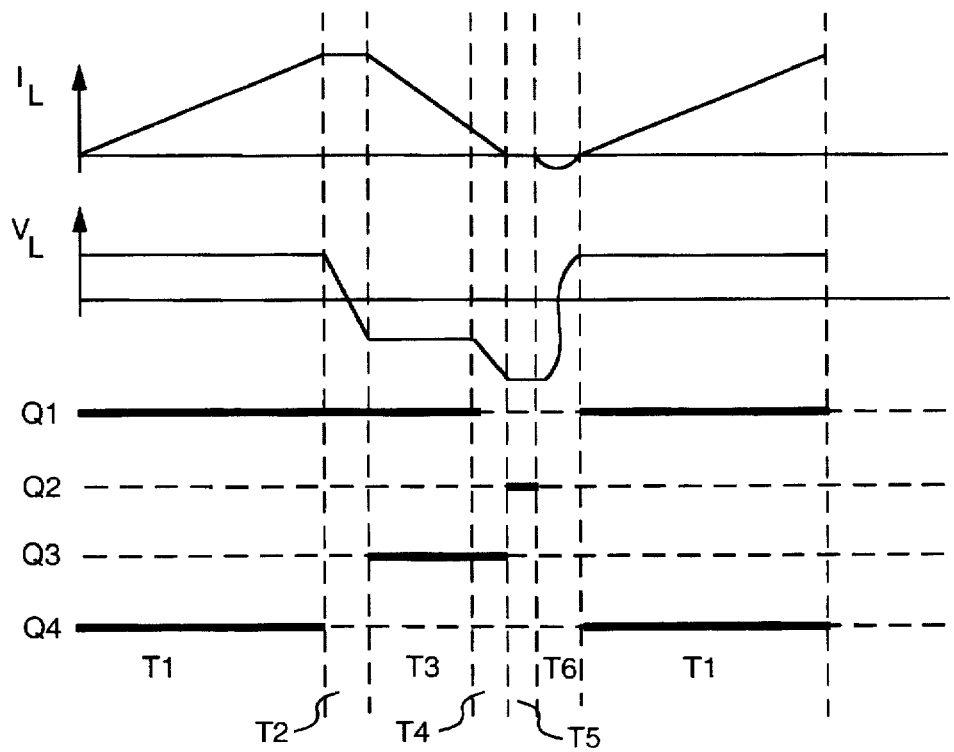

FIG. 9 illustrates a mode of operation for converter 30 of FIG. 6 when voltage V2 is larger than voltage V1 but power flow is desired from voltage V1 to voltage V2, thus requiring that the converter act as a boost converter. In a first phase of operation, commencing at time T1, switching devices Q1 and Q4 are in conduction and the voltage impressed across inductor L is positive and equal to the value of voltage of V1. Current builds up in inductor L to a selected positive value at which time T2 device Q4 is gated out of conduction loss-free, since the voltage across the device at the time of switching is essentially zero, beginning a second phase of operation. Current in the inductor is immediately conducted by capacitors Cr3 and Cr4, with capacitor Cr4 being charged and the capacitor Cr3 being discharged by the continued current. When voltage on the capacitor Cr4 is equal to voltage V2 and the voltage across capacitor Cr3 is equal to zero, diode D3 across device Q3 starts to conduct. This leads into a third phase of operation in which the voltage across inductor L is negative and equal to the value V1 minus V2, and current begins to decrease in the inductor. This third phase of operation is terminated by gating switching device Q1 out of conduction whereby the current previously supplied through device Q1 is immediately taken over by capacitors Cr1 and Cr2. This switching of device Q1 is also loss-free since the voltage across the device is zero at the time of switching and the current is immediately transferred to the capacitors such that capacitor Cr1 becomes charged and, at the same time, capacitor Cr2 is discharged. At the end of this fourth phase of operation, the voltage across capacitor Cr2 should be zero. To insure that the voltage on capacitor Cr2 is zero, device Q2 is switched into conduction in a fifth phase for a very short time interval, although this action is not necessary if the voltage across capacitor Cr2 is substantially zero. Following the fifth phase of operation, inductor L and capacitors Cr1, Cr2, Cr3 and Cr4 all form a ringing circuit which is forced by voltage V2, and the voltage across capacitor Cr3 can swing up to a maximum of V2. When the voltage across capacitor Cr3 swings up to its maximum value, switching devices Q1 and Q4 can be gated into conduction since the voltage across these devices and current in the devices are zero at that time. Current control is achieved in this method of operation by varying the duration of phase 1 and phase 3. Soft switching is assured for switching of devices Q1 and Q4.

Figure 9A:
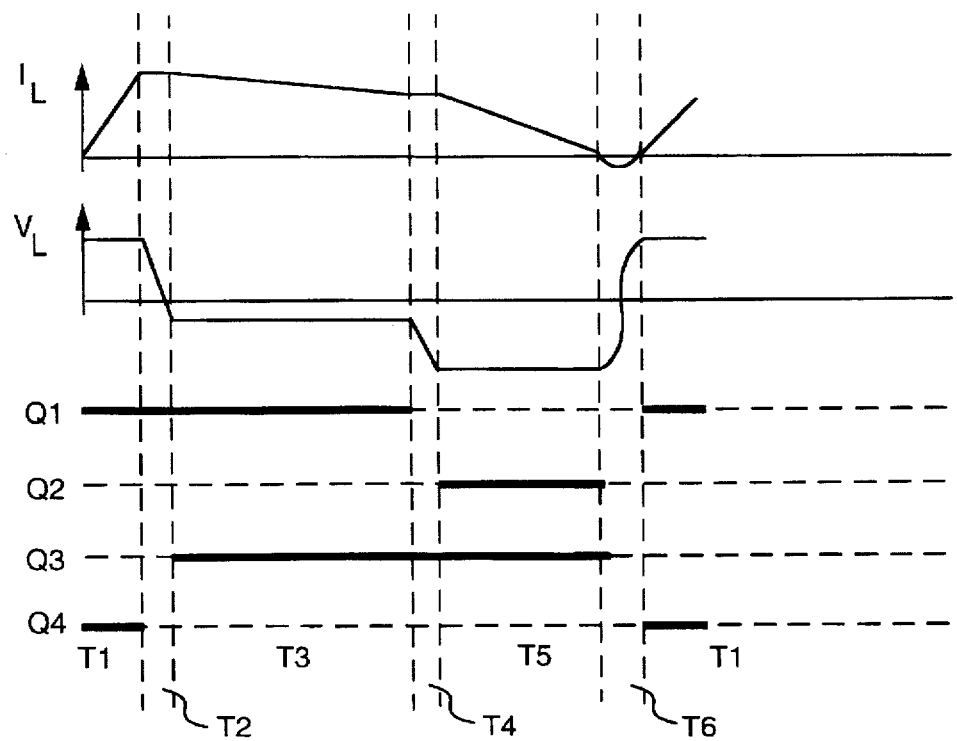

A modified method of operation is required if voltage V2 is larger than voltage V1 and power transfers from vokage V1 to voltage V2 but voltage V2 is only slightly larger than voltage V1. Improved current control ability is added by modifying and rearranging phases 5 and 6, as indicated in FIG. 9A. In the first phase T1, switching devices Q1 and Q4 are in conduction and voltage across inductor L is positive and equal to voltage V1. Current increases in inductor L as shown by the waveform of current $I_L$. At phase 2, switching device Q4 is gated out of conduction with loss-free switching, since the voltage across the device is substantially zero and current in inductor L can be conducted by capacitors Cr3 and Cr4. Capacitor Cr4 is gradually charged at the same time that capacitor Cr3 is discharged. When the voltage on capacitor Cr4 is equal to V2 and the voltage across capacitor Cr3 is equal to zero, the diode of switching device Q3 starts to conduct and leads into a third phase of operation. During the third phase, the voltage across inductor L is negative and equal to the difference between voltages V1 and V2. Since voltage V1 is only slightly larger than voltage V2, the inductor voltage is relatively small and current decreases at a relatively slow rate. Phase 3 is followed by a new phase 5 (time T4) which is inserted along with a new phase 6 (time T5) prior to the original phase 4 (time T6). In the new phase 5 (time T4), switching device Q1 is switched off under loss-free conditions with the inductor current being taken over by capacitors Cr1 and Cr2. As capacitor Cr1 is charged to the voltage V1 and capacitor Cr2 is discharged to zero, the diode of switching device Q2 starts to conduct. The operation then transitions into phase 6 (time T5) in which the voltage across inductor L becomes negative and equal to voltage V2, with the current rapidly decreasing to zero. Phase six is terminated when current $I_L$ becomes zero, at which time all of the switching devices Q1–Q4 are non-conductive. In phase four (time T6), the inductor and capacitors Cr1–Cr4 form a ringing circuit forced by voltage V2 to cause the voltage across capacitor Cr2 to swing up to a maximum of voltage V2. The voltage across capacitor Cr3 also swings up to a maximum of voltage V2. At this time, switching devices Q1 and Q4 can be gated into conduction without any losses because both voltage across these devices and current in the devices are zero. Soft switching is therefore assured for switching devices Q2 and Q4 into and out of conduction. Current control is achieved in this method by varying the relative durations of phases 1, 3 and 6.

Figure 9B:
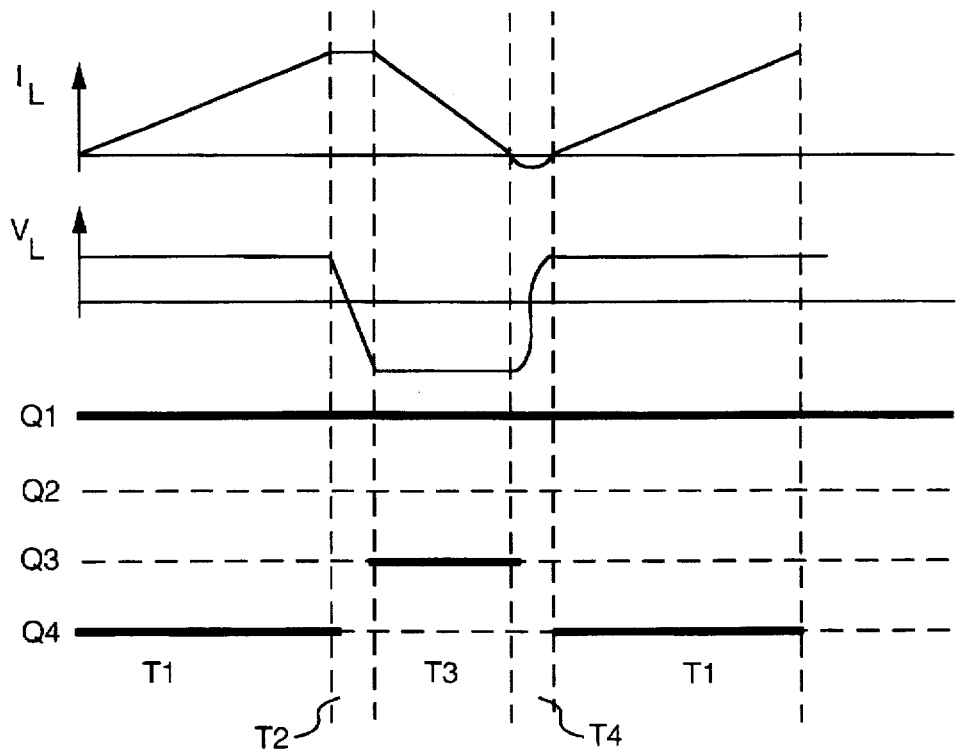

A somewhat different mode of operation, illustrated in FIG. 9B, is required if voltage V1 is less than one-half the voltage V2 and converter 30 is still required to act as a boost converter to transfer power from voltage V1 to voltage V2. In this mode, switching device Q1 is maintained continuously conductive and device Q2 is maintained non-conducting. In phase 1, switching devices Q1 and Q4 conduct, thereby impressing voltage V1 across inductor L, causing inductor current to increase in a positive direction as shown by waveform $I_L$. At the end of phase 1, device Q4 is switched off under loss-free conditions since the voltage across the device is essentially zero and the current in device Q4 is taken over by capacitors Cr3 and Cr4, charging capacitor Cr4 while at the same time discharging capacitor Cr3. When the voltage on capacitor Cr4 is equal to voltage V2 and the voltage across capacitor Cr3 is equal to zero, diode D3 starts to conduct. This leads into a third phase of operation in which the voltage across inductor L is negative and equal to the difference between voltage V1 and voltage V2, causing the inductor current to decrease. The third phase of operation is terminated when current $I_L$ becomes zero, at which time inductor L and capacitors Cr3 and Cr4 form a ringing circuit forced by the voltage difference between voltages V2 and V1. At the same time, diode D1 becomes conductive and the voltage across capacitor Cr3 swings up to a maximum of two times the difference between voltages V2 and V1, or voltage V2, whichever comes first. At this time, switching device Q4 can be gated into conduction without any switching losses because voltage across the device and current in the device are at zero. Thus, soft switching to a non-conductive state is assured for device Q4. However, soft switching of device Q4 to a conductive state is only guaranteed if voltage V1 is smaller than one-half the voltage V2. If voltage V1 becomes larger than one-half the voltage V2, some switching losses will occur, although these losses will be less than if device Q4 were hard switched with the voltage applied. Current in inductor L can be controlled by varying the duration of phase 1 and phase 3 in this method of operation.

Figure 10:
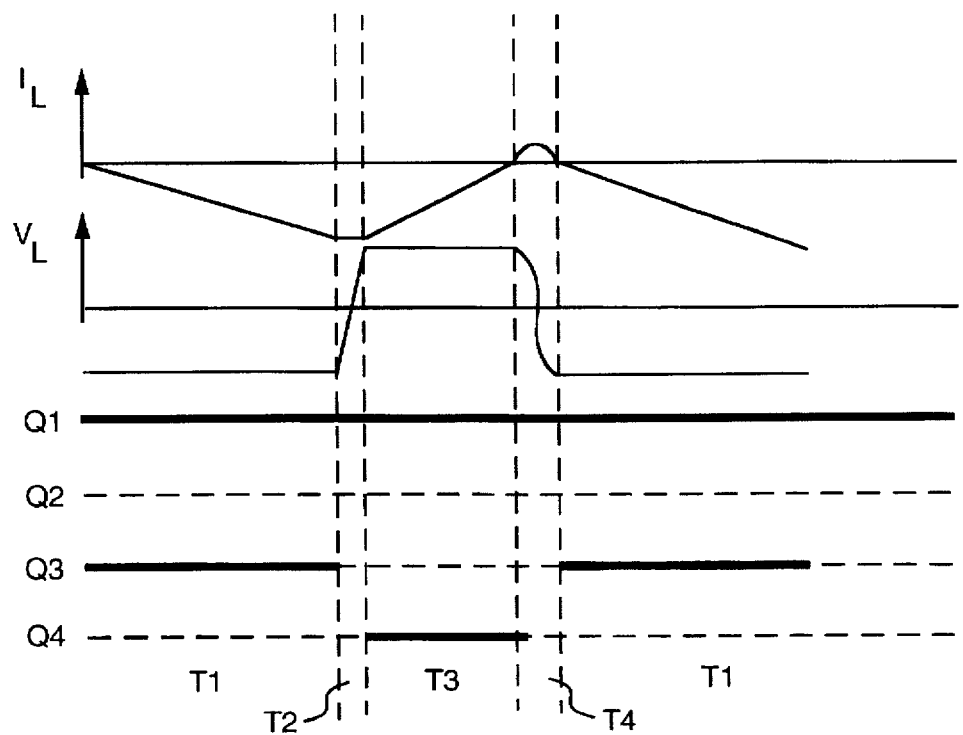

Another mode of operating converter 30 occurs when voltage V2 is larger than voltage V1 and power transfer is desired from voltage V2 to voltage V1. In such condition, the converter acts as a buck converter. As indicated in FIG. 10, the operation is initiated in a first phase by gating each of switching devices Q1 and Q2 into a continuous conducting mode. During phase 1, device Q3 is conducting and device Q4 is non-conducting. The voltage across inductor L is negative and equal to the difference between voltages V1 and V2 so that current increases in a negative direction through inductor L as shown by the waveform of current $I_L$. Following the first phase of operation, a second phase is initiated in which switching device Q3 is switched out of condition in an essentially loss-free operation since there is no voltage across the device and current in the device is immediately taken over by capacitors Cr3 and Cr4. When capacitor Cr3 is charged to the voltage V2 and capacitor Cr4 is fully discharged to zero volts, diode D4 across switching device Q4 starts to conduct. This action leads into a third phase during which the voltage across inductor L is positive and equal to voltage V1, causing the inductor current to decrease. Phase 3 terminates when the inductor current becomes zero. In the next phase, i.e., phase 4, inductor L and capacitors Cr3 and Cr4 form a ringing circuit forced by voltage V1. Switching device Q1 begins conducting current and voltage across capacitor Cr4 swings up to a maximum value of V2 or two times the voltage V1, whichever comes first. At the occurrence of this event, switching device Q3 can be turned on without any losses because the voltage across the device and current in the device are zero. Current control is obtained by varying the durations of phases 1 and 3. Soft switching is assured for switching device Q3 out of conduction, but soft switching for gating device Q3 into conduction is assured only if voltage V1 is larger than one-half the voltage V2. If voltage V1 becomes smaller than one-half the voltage V2, some switching losses will occur but they will be less than would occur under purely hard switched conditions as illustrated in FIG. 10.

Figure 10A:
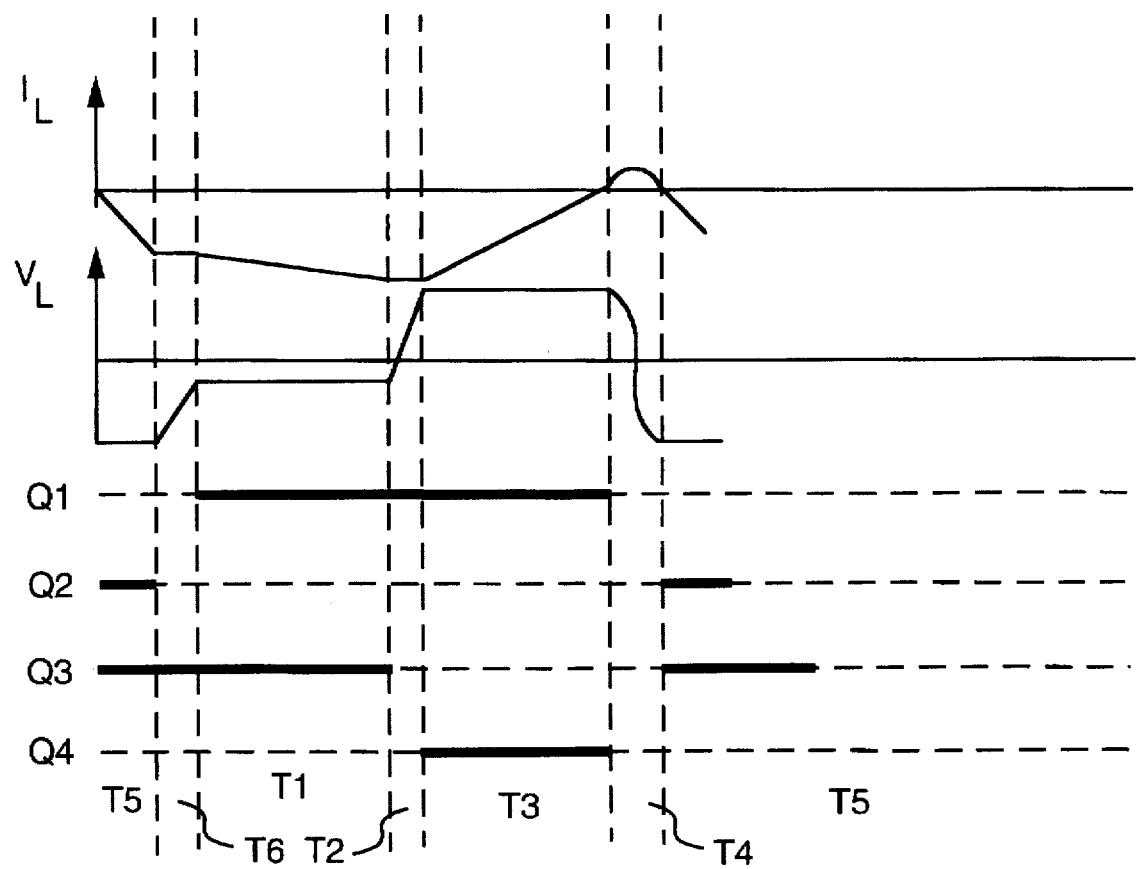

FIG. 10A illustrates a method for improving current control under conditions in which voltage V2 is only slightly larger than voltage V1 and power is desired to be transferred from voltage V2 to voltage V1. Converter 30 acts as a buck converter and phases 1, 2 and 3 are operated in the same manner as described for FIG. 10. However, two new phases 5 and 6 are added to provide the improved control. In phase 5, switching devices Q2 and Q3 are made conductive with devices Q1 and Q4 non-conductive so that the voltage impressed across inductor L is negative and equal to the value of voltage V2. Current in inductor L increases in a negative direction as shown by the graph of current $I_L$. Following phase 5, a new phase, 6, is utilized in which switching device Q2 is switched out of conduction under loss-free conditions as previously discussed, and inductor current is immediately taken over by capacitors Cr1 and Cr2. When capacitor Cr2 has been fully charged and capacitor Cr1 discharged so that voltage across capacitor Cr2 is equal to voltage V1 and voltage across capacitor Cr1 is equal to zero, diode D1 begins to conduct. This action leads into the previously-described phase 1 during which the voltage across inductor L is negative and equal to the difference between voltages V1 and V2. Since this difference in voltage is relatively small, inductor current increases in a negative direction at a slow rate. In the next-occurring phase 2, switching device Q3 is switched out of conduction under loss-free conditions, with the current in device Q3 being immediately taken over by capacitors Cr3 and Cr4. When capacitor Cr3 has become charged to the magnitude of voltage V2 and capacitor Cr4 is fully discharged, diode D4 begins to conduct, leading into the third phase of operation in which the voltage across inductor L is positive and equal to the value of voltage V1. Application of voltage V1 across inductor L causes a rapid current decrease. When current in inductor L becomes zero, all of the switching devices are in a non-conducting condition, as indicated in phase 4. During this phase 4, capacitors Cr1–Cr4 and inductor L together form a ringing circuit which is forced by voltage V1. The voltage across capacitor Cr1 can swing up to a maximum of voltage V1 or V2, whichever comes first. Furthermore, the voltage across capacitor Cr4 can swing up to a maximum of voltage V1 or V2, whichever comes first. At this point, switching devices Q2 and Q3 can be turned on without any losses since the voltage across the devices and current in the devices are essentially zero. Current control is achieved by varying the relative time duration of phases 1, 3 and 6. In this mode, soft switching into and out of conduction is assured for devices Q2 and Q3.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A bidirectional buck boost converter for regulating power flow between first and second voltage sources in which each source voltage level is subject to change and power flow is independent of relative voltage levels, each of the voltage sources having a positive terminal and a negative terminal, the converter comprising:

first and second switching devices serially coupled between the positive and negative terminals of the first voltage source;

third and fourth switching devices serially coupled between the positive and negative terminals of the second voltage source;

first and second diodes coupled in parallel with said first and second switching devices, respectively, and poled to conduct current from said negative terminal of said first voltage source to said positive terminal of said first voltage source;

third and fourth diodes coupled in parallel with said third and fourth switching devices, respectively, and poled to conduct current from said negative terminal of said second voltage source to said positive terminal of said second voltage source;

an inductor coupled between a junction intermediate said first and second switching devices and a junction intermediate said third and fourth switching devices;

conductive means coupling one of said terminals of one polarity of said first voltage source to one of said terminals of said one polarity of said second voltage source; and gating means for enabling operation of each of said switching devices for transferring power between said voltage sources.

2. The converter of claim 1 including first, second, third and fourth capacitors, respectively, coupled in parallel with said first, second, third and fourth switching devices, respectively.

3. A method for operating the bidirectional buck boost converter of claim 1 to transfer power from the first voltage source to the second voltage source when voltage at the first source is greater than voltage at the second source, comprising the steps of:

placing the third switching device into a continuous conducting mode and the fourth switching device into a non-conducting mode;

gating the first switching device into conduction during a first time interval to establish a current in the inductor and the third diode such that power is transferred from the first voltage source to the second voltage source;

gating the first switching device out of conduction upon completion of the first time interval;

gating the second switching device into conduction for a second time interval immediately after the farst time interval so as to reverse voltage polarity across the inductor and reduce current therein; and repeating each of the gating steps in sequence while varying the relative durations of the first and second time intervals to control inductor current.

4. A method for operating the bidirectional buck boost converter of claim 1 to transfer power from the first voltage source to the second voltage source when voltage at the first source is greater than voltage at the second source, comprising the steps of:

gating, during a first time interval, the first and third switching devices into a conducting mode and the second and fourth switching devices into a non-conducting mode, so as to establish a current in the inductor and third diode such that power is transferred from the first voltage source to the second voltage source;

gating the first switching device out of conduction upon completion of the first time interval;

gating the second switching device into conduction for a second time interval immediately after the farst time interval so as to reverse polarity across the inductor and reduce current therein;

gating the second and third switching devices out of conduction upon completion of the second time interval;

gating both the first and the fourth switching devices into conduction for a third time interval immediately following the second time interval, so as to apply the voltage of the first voltage source across the inductor to establish a rapid current increase therein;

gating the first and fourth switching devices out of conduction upon completion of the third time interval; and repeating each of the gating steps in sequence while varying the relative durations of each of the time intervals to control inductor current.

5. A method for operating the bidirectional buck boost converter of claim 1 to transfer power from the second voltage source to the first voltage source when voltage at the first source is greater than voltage at the second source, comprising the steps of:

placing the third switching device into a continuously conducting mode and the fourth switching device into a non-conducting mode;

gating the second switching device into conduction during a first time interval to establish a current in the inductor from the second voltage source;

gating the second switching device out of conduction upon completion of the first time interval;

gating the first switching device into conduction for a second time interval immediately following the first time interval so that inductor current is directed to the first voltage source; and repeating each of the gating steps in sequence while varying the relative durations of the first and second time intervals to control inductor current.

6. A method for operating the bidirectional buck boost converter of claim 1 to transfer power from the second voltage source to the first voltage source when voltage at the first source is greater than voltage at the second source, comprising the steps of gating, during a first time interval, the second and third switching devices into a conducting mode and the first and fourth switching devices into a non-conducting mode so as to establish a current in the inductor from the second voltage source;

gating the second switching device out of conduction upon completion of the first time interval;

gating the first switching device into conduction for a second time interval immediately following the first time interval so that inductor current is directed to the first voltage source;

17 gating the third switching device out of conduction upon completion of the second time interval;

gating the fourth switching device into conduction for a third time interval immediately following the second time interval; and repeating each of the gating steps in sequence while varying the relative durations of each of the time intervals to control inductor current.

7. A method for operating the bidirectional buck boost converter of claim 1 to transfer power from the first voltage source to the second source when voltage at the second source is greater than voltage at the first source, comprising the steps of:

placing the first switching device into a continuously conducting mode and the second switching device into a non-conducting mode;

gating the fourth switching device into conduction during a first time interval to establish a current in a first direction in the inductor from the first voltage source;

gating the fourth switching device out of conduction upon completion of the first time interval;

gating the third switching device into conduction for a second time interval immediately following the first time interval so that inductor current continues to flow in the first direction and is transferred through the third diode to the second voltage source; and repeating each of the gating steps in sequence while varying the relative durations of the first and second time intervals to control inductor current.

8. A method for operating the bidirectional buck boost converter of claim 1 to transfer power from the first voltage source to the second source when voltage at the second source is greater than voltage at the first source, comprising the steps of:

gating, during a first time interval, the first and fourth switching devices into a conducting mode and the second and third switching devices into a non-conducting mode, so as to establish a current in a first direction in the inductor from the first voltage source;

gating the fourth switching device out of conduction upon completion of the first time interval;

gating the third switching device into conduction for a second time interval immediately following the first time interval so that inductor current continues to flow in the first direction and is transferred through the third diode to the second voltage source;

gating the first switching device out of conduction upon completion of the second time interval;

gating, for a third interval immediately following the second time interval, the second and third switching devices into conduction and the first switching device out of conduction; and repeating each of the gating steps while varying the relative durations of each of the time intervals to control inductor current.

9. The method for operating the bidirectional buck boost converter of claim 1 to transfer power from the second voltage source to the first voltage source when voltage at the second source is greater than voltage at the first source, comprising the steps of:

placing the first switching device into a continuously conducting mode and the second switching device into a non-conducting mode;

gating the third switching device into conduction during a first time interval to establish a current in the inductor from the second voltage source;

18 gating the third switching device out of conduction upon completion of the first time interval;

gating the fourth switching device into conduction for a second time interval immediately following the first time interval so that voltage across the inductor is reversed and current therein decreases; and repeating each of the gating steps in sequence while varying the relative durations of each of the first and second time intervals to control inductor current.

10. The method for operating the bidirectional buck boost converter of claim 1 to transfer power from the second voltage source to the first voltage source when voltage at the second source is greater than voltage at the first source, comprising the steps of:

gating, during a first time interval, the first and third switching devices into a conducting mode and the second and fourth switching devices into a non-conducting mode, so as to establish a current in the inductor from the second voltage source;

gating the third switching device out of conduction upon completion of the first time interval;

gating the fourth switching device into conduction for a second time interval immediately following the first time interval so that voltage across the inductor is reversed and current therein decreases;

gating the first and fourth switching devices out of conduction upon completion of the second time interval;

gating, for a third time interval immediately following the second time interval, both the second and the third switching devices into conduction so that the voltage of the second voltage source is applied across the inductor to establish a rapid current increase therein;

gating the second switching device out of conduction upon completion of the third time interval; and repeating each of the gating steps in sequence while varying the relative durations of each of the time intervals to control inductor current.

11. The method for operating the bidirectional buck boost converter of claim 2 to transfer power from the first voltage source to the second voltage source when voltage at the first source is greater than voltage at the second source, comprising the steps of:

placing the third switching device into a continuous conducting mode and the second and fourth switching devices into a non-conducting mode;

gating the first switching device into conduction during a first time interval to establish a current in the inductor and third diode such that power is transferred from the first voltage source to the second voltage source;

gating the first switching device out of conduction upon completion of the first time interval;

supplying current to the inductor through the first capacitor and from the second capacitor until voltage across the first capacitor is substantially equal to the voltage of the first voltage source and voltage across the second capacitor is substantially equal to zero, and thereafter gating the second switching device into conduction allowing current flow to continue in the inductor from the second diode in parallel with the second switching device;

gating the second switching device out of conduction when current reverses in the inductor as a consequence of the inductor and first and second capacitors functioning as a ringing circuit;

gating the first switching device into conduction when the voltage across the second capacitor is equal to the voltage of the first voltage source such that the voltage across the first switching device is substantially zero; and repeating the gating and supplying current steps in sequence.

12. The method for operating the bidirectional buck boost converter of claim 2 to transfer power from the first voltage source to the second voltage source when voltage at the first source is greater than voltage at the second source, comprising the steps of:

placing the third switching device into a continuous conducting mode and the second and fourth switching devices into a non-conducting mode;

gating the first switching device into conduction during a first time interval to establish a current in the inductor and third diode such that power is transferred from the first voltage source to the second voltage source;

gating the first switching device out of conduction upon completion of the first time interval;

supplying current to the inductor through the first capacitor and from the second capacitor until voltage across the first capacitor is substantially equal to the voltage of the first voltage source and voltage across the second capacitor is substantially equal to zero, and thereafter gating the second switching device into conduction allowing current flow to continue in the inductor from the second diode in parallel with the second switching device;

gating the second switching device out of conduction when current reverses in the inductor as a consequence of the inductor and first and second capacitors functioning as a ringing circuit;

gating the first switching device into conduction when the voltage across the second capacitor is equal to twice the voltage of the second voltage source such that the voltage across the first switching device is substantially zero; and repeating the gating and supplying current steps in sequence.

13. The method for operating the bidirectional buck boost converter of claim 2 to transfer power from the first voltage source to the second voltage source when voltage at the first source is greater than voltage at the second source, comprising the steps of:

placing the second and fourth switching devices into a non-conductive mode;

gating the first and third switching devices into conduction during a rest time interval to establish a current in the inductor and third diode such that power is transferred from the first voltage source to the second voltage source;

gating the first switching device out of conduction upon completion of the first time interval;

supplying current to the inductor through the first capacitor and from the second capacitor until voltage across the first capacitor is substantially equal to the voltage of the first voltage source and voltage across the second capacitor is substantially equal to zero, and thereafter gating the second switching device into conduction, allowing current flow to continue in the inductor from the second diode in parallel with the second switching device;

gating the second and third switching device out of conduction when inductor current reverses as a consequence of the inductor and first and second capacitors functioning as a ringing circuit;

gating the first and fourth switching devices into conduction when the voltage across the second capacitor is equal to the voltage of the first voltage source such that the voltage across the first switching device is substantially zero;

gating the first and fourth switching devices into conduction to thereby couple the inductor across the first voltage source for effecting a rapid current build up in the inductor;

gating the fourth switching device out of conduction when current in the inductor has built to a preselected level at which current is supplied from the third and fourth capacitors until voltage across the third capacitor is equal to zero and voltage across the fourth capacitor is equal to the value of the second voltage source whereupon current transfers to a path through the third diode; and repeating the gating and supplying current steps in sequence.

14. The method for operating the bidirectional buck boost converter of claim 2 to transfer power from the second voltage source to the first voltage source when voltage at the first source is larger than voltage at the second source, comprising the steps of:

gating the second and third switching devices into a conductive mode whereupon a voltage difference between the first and second voltage sources is impressed across the inductor to cause current in the inductor to increase in a negative direction;

gating the second switching device out of conduction so that inductor current is supplied through the first and second capacitors;

gating the third switching device into conduction to allow the second capacitor to be charged and the first capacitor to be discharged, whereupon the first diode begins to conduct so as to transfer inductor current from the second voltage source to the first voltage source;

gating the third switching device out of conduction when inductor current has decreased to a preselected value, such that provision of inductor current is taken over by the third and fourth capacitors until the third capacitor is charged and the fourth capacitor is discharged, whereupon the inductor and the capacitors form a ringing circuit forced by the first voltage source;

gating the first switching device out of conduction when inductor current has decreased to zero;

gating the second switching device into conduction when voltage across the first capacitor reaches a maximum level equal to the magnitude of voltage on the first voltage source; and repeating the gating steps in sequence while varying the relative durations of conduction of the switching devices to control inductor current.

15. The method for operating the bidirectional buck boost converter of claim 2 to transfer power from the second voltage source to the first voltage source when voltage at the first source is larger than voltage at the second source, comprising the steps of:

placing the third switching device into a conductive mode;

gating the second switching device into a conductive mode whereupon a voltage difference between the first and second voltage sources is impressed across the inductor to cause current in the inductor to increase in a negative direction;

gating the second switching device out of conduction so that inductor current is supplied through the first and second capacitors;

gating the first switching device into conduction to allow the second capacitor to be charged and the first capacitor to be discharged, whereupon the first diode begins to conduct so as to transfer inductor current from the second voltage source to the first voltage source;

gating the first switching device out of conduction when inductor current has decreased to zero;

gating the second switching device into conduction when voltage across the first capacitor reaches a maximum level equal to the magnitude of voltage of the first voltage source; and repeating the gating steps in sequence while varying the relative durations of conduction of the switching devices to control inductor current.

16. The method for operating the bidirectional buck boost converter of claim 2 to transfer power from the first voltage source to the second voltage source when voltage at the second source is larger than voltage at the first source, comprising the steps of:

gating the first and fourth switching devices into a conductive mode whereupon the voltage of the first voltage source is impressed across the inductor and current builds up in the inductor to a preselected level;

gating the fourth switching device out of conduction whereupon inductor current is supplied through the third and fourth capacitors until the fourth capacitor has become charged to the voltage of the second voltage source and the third capacitor has been fully discharged so that the third diode begins to conduct;

gating the third switching device into conduction whereupon a reverse voltage is applied across the inductor to cause inductor current to decrease;

gating the first switching device out of conduction when inductor current reaches a preselected value, whereupon inductor current is carried by the first and second capacitors until the first capacitor is fully charged and the second capacitor is fully discharged;

gating the second switching device into conduction when the first capacitor has become charged to the voltage of the first voltage source and the second capacitor has been fully discharged;

blocking conduction in each of the first, second, third and fourth switching devices to allow the first, second, third and fourth capacitors, together with the inductor, to function as a ringing circuit forced by the voltage of the second voltage source such that voltage across the third capacitor swings up to a maximum value of the voltage of the second voltage source; and repeatedly performing the recited steps in sequence.

17. The method for operating the bidirectional buck boost converter of claim 2 to transfer power from the first voltage source to the second voltage source when voltage at the second source is larger that voltage at the first source, comprising the steps of:

placing the first switching device into a conductive mode;

gating the fourth switching device into a conductive mode whereupon the voltage of the first voltage source is impressed across the inductor and current builds up in the inductor to a preselected level;

gating the first switching device out of conduction whereupon inductor current is supplied through the third and fourth capacitors until the fourth capacitor has become charged to the voltage of the second voltage source and the third capacitor has been fully discharged so that the third diode begins to conduct;

gating the third switching device into conduction whereupon a reverse voltage is applied across the inductor to cause inductor current to decrease;

gating the third switching device out of conduction when the first capacitor has become charged to the voltage of the first voltage server and the second capacitor has been fully discharged;

blocking conduction in each of the first, second, third and fourth switching devices to allow the first, second, third and fourth capacitors, together with the inductor, to function as a ringing circuit forced by the voltage of the second voltage source such that voltage across the third capacitor swings up to a maximum value of the voltage of the second voltage source; and repeatedly performing the recited steps in sequence.

18. The method for operating the bidirectional buck boost converter of claim 2 to transfer power from the second voltage source to the first voltage source when voltage of the second source is larger than voltage of the first source, comprising the steps of:

placing the first switching device into continuous conduction;

gating the third switching device into conduction to place the first voltage source across the inductor;

gating the third switching device out of conduction when inductor current reaches a preselected value, whereupon the third and fourth capacitors supply inductor current until the third capacitor is charged to the voltage of the second voltage source and the fourth capacitor is fully discharged so that the fourth diode begins to conduct;

gating the fourth switching device into conduction to reverse effective voltage across the inductor and cause inductor current to begin to decrease;

gating the fourth switching device out of conduction when inductor current is substantially zero, such that the inductor and the third and fourth capacitors form a ringing circuit in which current is forced by the first voltage source gating the third switching device into conduction; and repeating the gating steps in sequence.

19. The method for operating the bidirectional buck boost converter of claim 2 to transfer power from the second voltage source to the first voltage source when voltage of the second source is larger than voltage of the first source, comprising the steps of:

gating the first and third switching devices into conduction to place the first voltage source across the inductor;

gating the third switching device out of conduction when inductor current reaches a preselected value, whereupon the third and fourth capacitors supply inductor current until the third capacitor is charged to the voltage of the second voltage source and the fourth capacitor is fully discharged so that the fourth diode begins to conduct;

gating the fourth switching device into conduction to reverse effective voltage across the inductor and cause inductor current to begin to decrease;

gating the first and fourth switching devices out of conduction when inductor current is substantially zero, such that the inductor and the third and fourth capacitors form a ringing circuit in which current is forced by the first voltage source gating the third switching device into conduction;

gating the second and third switching devices into conduction to impress the voltage of the second voltage source across the inductor to cause inductor current to increase in a negative direction;

gating the second switching device out of conduction so that inductor current is supplied by the first and second capacitors until the second capacitor is charged to the voltage of the first voltage source and the first capacitor is fully discharged; and repeating the gating steps in sequence while controlling the relative durations of conduction of each of the switching devices to control current through the inductor.

* * * * *